United States Patent [19]

Holthouse et al.

[11] Patent Number: 5,712,546
[45] Date of Patent: Jan. 27, 1998

[54] CONTROL SYSTEM FOR DOOR POSITIONING ASSEMBLY

[75] Inventors: Jeffery A. Holthouse, Richmond, Ind.; David C. Rice, Springbro, Ohio

[73] Assignee: American Metal Door Company, Inc., Richmond, Ind.

[21] Appl. No.: 367,953

[22] Filed: Jan. 3, 1995

(Under 37 CFR 1.47)

[51] Int. Cl.$^6$ .................................................. H02P 1/00
[52] U.S. Cl. ........................ 318/282; 318/286; 318/640; 318/652; 49/139
[58] Field of Search .................................. 318/282, 286, 318/466–468, 626, 640, 652, 266; 49/139, 118, 26, 120

[56] References Cited

U.S. PATENT DOCUMENTS

| | | |
|---|---|---|
| 879,883 | 2/1908 | Mull . |
| 1,343,757 | 6/1920 | Akers . |
| 1,816,258 | 7/1931 | Lake . |
| 3,072,394 | 1/1963 | Urquhart . |
| 3,834,081 | 9/1974 | Catlett . |
| 3,872,622 | 3/1975 | Berk . |
| 4,370,826 | 2/1983 | Davidson . |
| 5,105,131 | 4/1992 | Schap ........................ 318/282 |
| 5,209,082 | 5/1993 | Ha ........................ 318/282 X |
| 5,295,334 | 3/1994 | Haraden ........................ 49/139 X |
| 5,373,120 | 12/1994 | Barrett et al. ........................ 49/120 X |
| 5,377,448 | 1/1995 | Boyd et al. . |
| 5,396,158 | 3/1995 | Long et al. ........................ 318/282 |

FOREIGN PATENT DOCUMENTS 520887  7/1953  Belgium .

OTHER PUBLICATIONS

"DF8 Plus Series" Instruction Manual, Rev. 1, Saftronics, Inc., Ft. Myers, Florida.

*Primary Examiner*—Karen Masih
*Attorney, Agent, or Firm*—Barnes & Thornburg

[57] ABSTRACT

A control system is provided for a door positioning assembly having a door mounted on a track. The door is movable between an open position and a closed position. The door has a leading edge adjacent a door opening, an edge arranged to define a second opening, and a pass door pivotably coupled to the second opening. The control system includes a proximity detector for providing a door position signal in response to the position of the door on the track system, and a user input for providing user input signals including open inputs, stop inputs including signals provided by a stop button of a user-operated switch, and close inputs in response to user commands. The system also includes a plurality of sensors for providing stop input signals in response to the position of an object located within a detection zone adjacent the door opening, in response to contact between an object and the leading edge of the door, and in response to the position of the pass door. The system further includes a signal processor to provide controller instructions in response to the door position signal and the user input signals, and a controller configured to vary the speed and direction of travel of the door in response to the controller instructions.

28 Claims, 10 Drawing Sheets

CONTROL SYSTEM FOR DOOR POSITIONING ASSEMBLY

BACKGROUND AND SUMMARY OF THE INVENTION

The present invention relates to door positioning assemblies, and particularly to a control system for a door positioning assembly for use with doors that move with a rectilinear motion. More particularly, the invention relates to a control system for an electrical motor that rotates a lead screw that operates a door positioning system to position rectilinearly moving doors.

Various applications such as sliding industrial fire or service doors in a manufacturing plant require that the doors be positioned rapidly. Positioning systems for positioning doors include linear and rotary systems. Linear systems are available, but are typically expensive. Rotary systems are an economical alternative to linear systems.

Rotary systems convert the rotary output of a motor to the desired linear door motion and are generally of the perpendicular or parallel type. In a perpendicular type system, the axis of rotation of the motor shaft is perpendicular to the direction of movement of the door. In a parallel type system, the motor shaft rotates about an axis that lies parallel to the line of motion of the door.

The basic form of the perpendicular motor system has a continuous loop of cable or chain running over a sheave mounted on the motor shaft (or on a shaft driven with the motor shaft). As the motor turns, it draws the cable or chain over the sheave, and the door moves with the cable (or chain). The many variations on this theme are associated with how the motor is integrated into the loop.

The basic forms of parallel motor systems are based on lead screws and threadless rods. The threadless rod principle involves a rod rotating within inclined rollers which are attached to the door. As the rod rotates, there is a component of the friction force which acts along the length of the rod. This component of the friction force causes the inclined rollers to travel back and forth along the rod, depending upon the direction of the rotation.

In another parallel type system, the motor rotates a threaded member, or lead screw, to positively drive a nut towards or away from the motor. However, movement of large doors typically requires long lead screws. Long unsupported lead screws have problems with critical speeds which limit the motor speed. Limited motor speed in turn limits the acceleration and speed of the door.

In one parallel type system the motor rotates a lead screw to positively drive a nut appended to a system of pulleys that cooperate with a cable to amplify the movement of the nut before transferring this movement through the cable to the door. This system is capable of moving a door weighing up to 1200 pounds at a rate of up to 48 inches per second.

What is needed for the various types of door positioning systems, though particularly needed for a system requiring the rapid implementation of such large door momentum changes as the system described above, is a control system that receives door-positioning commands, observes the condition of the sliding door, and then rapidly provides various door movement responses based on the observed conditions and commands.

According to the present invention, a control system for a door positioning assembly having a door mounted on a track, the door being movable between and open position and a closed position is provided. The control system includes proximity means for providing a door position signal in response to the position of the door on the track. The control system further includes signal processor means for providing controller instructions in response to the door position signal, and controller means for varying the speed and direction of travel of the door in response to the controller instructions.

The control system further includes user means for providing user input signals in response to user commands, and the signal processor means further includes means for providing controller instructions in response to the user input signals. Generally, the user input signals include open inputs, stop inputs, and close inputs. The signal processor means typically includes open means for instructing the controller to move the door in an open direction in response to open inputs, stop means for instructing the controller to stop the movement of the door in response to stop inputs, and close means for instructing the controller to move the door in a closed direction in response to close inputs.

In preferred embodiments, the open inputs include signals provided by open button means for providing an open input signal in response to a user-operated switch. The open inputs can also be provided by motion detector means for providing an open input signal in response to the motion of an object located within a detection zone. The detection zone is generally established by the placement of the motion detector means.

The stop inputs typically include signals provided by stop button means for providing a stop input signal in response to a user-operated switch, though they can also include photo electric means for providing a stop input signal in response to the position of an object located within a detection zone, and reverse edge means for providing a stop input signal in response to contact between an object and a leading edge of the door.

In addition, the door can be provided with an internal edge arranged to define a second opening and a pass door can be pivotably appended to the second opening. In this configuration, the stop inputs typically further include a signal provided by limit switch means for providing a close input signal in response to the position of the pass door.

The close inputs include signals provided by close button means for providing a close input signal in response to a user-operated switch. The control system can be configured to include auto close means for moving the door to the closed position when the door is not in the closed position in response to an absence of user inputs. In this configuration, the signal processor means typically includes auto close timer means for delaying actuation of the auto close means for a predetermined delay time in response to an absence of user inputs.

A typical movement cycle for a door controlled by the control system of the present invention starting from the fully closed position starts when the signal processor receives an open input. The door then begins translating toward the open position. The door speed quickly ramps to its open high speed at which it is propelled toward the open position at a fast opening speed. Once the door nears the fully open position, the speed of the door is quickly reduced to an open slow speed or creep speed. A regenerative drive uses the kinetic energy of the moving door to assist the motor as it slows to the creep speed. The door translates at the creep speed until it reaches the fully open position at which it stops. The creep speed typically allows for improved control of the door when it is brought to a halt.

An open push button on a manual control typically generates the open inputs to the signal processor, however open inputs can also be provided by a motion detector and a reverse edge on the leading edge of the door. In addition, a pedestrian open button can be provided that, when pressed, provides an open input that causes the door to open partially to permit pedestrian traffic through the door opening.

The signal processor recognizes stop inputs as well as open inputs. When a stop input is received, the door stops and remains stopped as long as the signal processor continues to receive the stop input signal. A stop push button on a manual control typically generates the stop input to the signal processor, however stop inputs can also be provided by limit switches on a pass door that indicate when the pass door is fully closed as well as a photoelectric cell having a beam positioned across the opening of the door.

A close cycle is similar to an open cycle in that after the signal processor receives a close input, the door quickly ramps to a close high speed as it translates toward the closed position. As the door nears the fully closed position, the regenerative drive helps to slow the door to the close low speed or creep speed. The door translates at the creep speed until it stops at the fully closed position.

A close push button on a manual control generates the close input to the signal processor. However, if the signal processor is receiving an open input and a close input at the same time, the close input will be ignored. Advantageously, the control system can be configured so that the signal processor causes the door to close following a predetermined delay after receiving the close signal. The control system can also be configured so that the signal processor is constantly provided with a close signal. A controller simultaneously provided with both of these configurations will provide instructions to keep the door open as long as the signal processor receives an open signal such as from a motion detector. After receiving the last open signal, the signal processor will pause for the predetermined delay before automatically providing instructions close the door.

Other objects and advantages of the invention will become apparent from the following description of a preferred embodiment presently perceived as the best mode for practice of the invention and consideration of the accompanying drawings.

DETAILED DESCRIPTION

Figure 1:
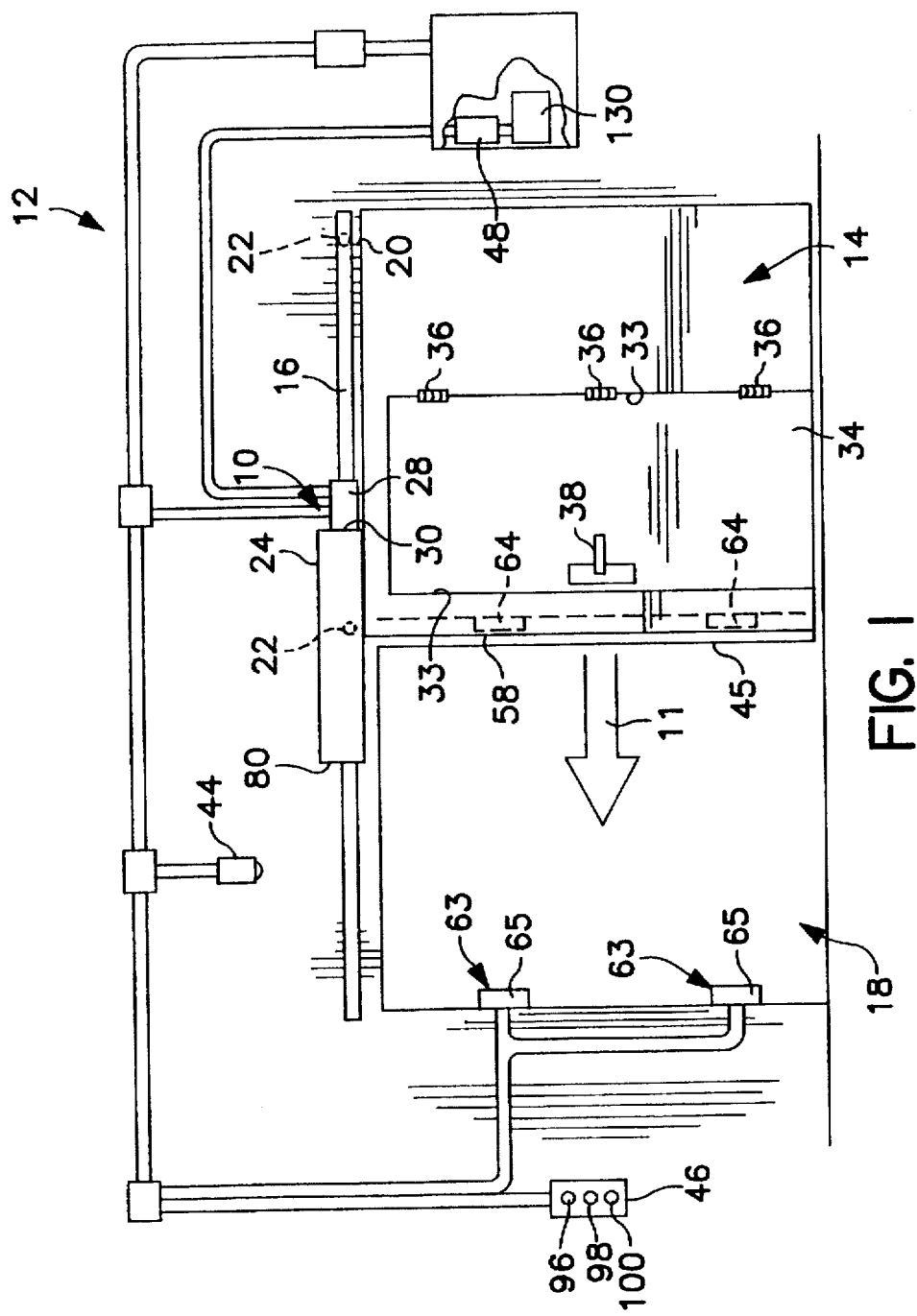
FIG. 1 is an elevation view of a door positioning assembly including a controller in accordance with the present invention and arranged to move a slidable door between an open position and a closed position.

An illustrative door positioning assembly 10 having a control system 12 in accordance with the present invention for controlling the motion of a door 14 between an open position and a closed position is illustrated in FIG. 1. The door 14 is movable between an open position shown in FIGS. 1 and 2 and a closed position shown in FIG. 5. The door 14 is movable in a closed direction 11 and an open direction 13 by a positioning assembly 10 including a control system 12. The door 14 is merely illustrative, and any type of door or panel can be moved by the positioning assembly 10.

A track 16 is mounted on a wall and positioned above, and extending along, an opening 18 in the wall. The track 16 is configured to include a pair of parallel roller-receiving channels (not shown) extending along the length of the track 16. A roller chassis 20 is connected to the door 14 and includes a plurality of rollers 22 that are arranged to ride in the channels in the track 16. Thus, as shown in FIG. 1, the door 14 is suspended from the track 16 and is movable along the track 16 to open and close the opening 18 in the wall.

A housing 24 containing the driving mechanism is mounted to the wall and is illustratively located above the door 14. The illustrated housing 24 is positioned adjacent the track 16 and is coupled by an operating cable 26 to the door 14 as shown in FIGS. 2-5. Because of the amplification aspect of the illustrative positioning assembly 10, the housing 24 can be only a small fraction of the length of the door 14 and located at the midpoint of the range of door movement. A drive motor 28 for actuating the drive mechanism is mounted on a proximal end 30 of the housing 24. The drive motor 28 is preferably electric, though any type of motor which will drive the system may be used.

If desired, the door 14 may be provided with a second opening 33 and a pass door 34 may be appended to the door 14 over the opening 33. The pass door 34 includes a handle 38 and is appended to the door 14 by hinges 36. The pass door 34 allows for passage through openings 18, 33 when the door 14 is in the closed position.

The control system 12 includes a motion detector 44 illustratively positioned above the opening 18 as shown in FIG. 1. The motion detector 44 is arranged to detect motion within a selected detection zone (not shown) adjacent to the opening 18. The size and location of the detection zone depends largely upon the placement of the motion detector 44 and it may be customized for each application. The motion detector 44 cooperates with a drive motor controller 48 to fully open the door 14 when motion is sensed by the motion detector 44. If motion is sensed while the door 14 is moving toward the closed position, the door 14 stops moving and then reverses motion to move to the fully open position. The preferred motion detector 44 is model D15 made by Microwave Sensor Inc. for approach only sensing and model D7 made by Microwave Sensor Inc. for sensing motion in directions both toward and away from the motion detector 44, though it is within the scope of the invention as presently perceived to use any suitable motion detector 44.

The control system 12 further includes a reverse edge 45 positioned along a distal side 58 of the door 14. The distal side 58 presents the leading edge of the door 14 as the door 14 moves toward the fully closed position. The reverse edge 45 consists of two spaced-apart contacts (not shown) that are arranged to become engaged upon contact of the reverse edge 45 with an object in the opening 18. The reverse edge 45 cooperates with the drive motor controller 48 to fully open the door 14 when an obstruction is sensed by the reverse edge 45. If an obstruction is sensed while the door 14 is moving toward the closed position, the door 14 stops moving and then reverses motion to move to the fully open position. The preferred reverse edge 45 is model ME113 made by Miller Edge Inc., though it is within the scope of the invention as presently perceived to use any suitable reverse edge 45.

The control system 12 may further be provided with a photo electric switch 63. The illustrative photo electric switch 63 includes two door beam transmitters 64 positioned adjacent to the opening 18 and two door beam receivers 65 positioned adjacent to the opening 18 opposite the receivers as shown, for example, in FIG. 1. The photo electric switch 63 cooperates with the drive motor controller 48 to fully open the door 14 when one of the door beam receivers 65 fails to detect a door beam generated by one of the door beam transmitters 64, indicating that an obstruction is present in the opening 18. If an obstruction is sensed while the door 14 is moving toward the closed position, the door 14 stops moving and then reverses motion to move to the fully open position. The preferred photo electric switch 63 is model DB11 made by Microwave Sensor Inc. for openings that are less than 20 feet (6.1 meters) wide and model GD11 for openings up to 30 feet (9.1 meters) wide, though it is within the scope of the invention as presently perceived to use any suitable photo electric switch 63.

The drive motor controller 48 for use in a preferred embodiment of the positioning assembly 10 having an electric drive motor 28 is configured to supply a constant current at various potentials to the drive motor 28. Altering the potential alters the speed and direction of rotation of the drive motor 28, altering the speed and direction of rotation of the lead screw 42, thereby altering the speed and direction of movement of the door 14.

The preferred drive motor controller 48 when the drive motor 28 is an electric drive motor is a DF8 Plus Series controller made by Saftronics, Inc. of Fort Meyers, Fla. Though there are many suitable drive motor controllers available, it has been found that the drive motor controller 48 selected for use should include the feature of full wave regenerative reversing. Regenerative reversing allows the control system 12 to use the kinetic energy of the moving door 14 to slow the drive motor 28 when reversing the direction of motion of the door 14.

A three-button manual control 46 is provided with the control system 12. The manual control 46 includes a stop button 96, an open button 98, and a close button 100 as illustrated in FIG. 1. Pressing the stop button 96 causes the door to stop. The door 14 will remain motionless as long as the stop button 96 is pressed. Pressing the open button 98 causes the door to fully open. Pressing the close button 100 causes the door to fully close. However, the control system 12 is designed to provide open priority so that when an open input such as the open button 98 is activated, activation of a close input such as the close button 100 is ignored.

A schematic representation of a positioning assembly 10 including a control system 12 according to the present invention is illustrated in FIGS. 2–5 and is disclosed in U.S. patent application Ser. No. 08/007673 filed on Jan. 21, 1993, the disclosure of which is herein incorporated by reference. The system includes operating cable 26 for coupling the door 14 to the positioning assembly 10, a system of pulleys, a carriage 40 that is longitudinally movable inside the housing 24, and a drive motor 28 to move the carriage 40. A lead screw 42 couples the drive motor 28 to the carriage 40. The carriage 40 is essentially a nut that travels along the lead screw 42, the nut having a plurality of pulleys rotatably coupled thereto.

The operating cable 26 has a first end 50 that is connected to a proximal end 52 of the door 14, a middle portion 54 that engages the system of pulleys, and a second end 56 that is connected to the distal side 58 of the door 14. A clamp 60 holds one segment of the operating cable 26 immovable relative to the housing 24.

The illustrative pulley system includes fourteen pulleys. Six pulleys are rigidly coupled to the carriage 40, four pulleys are coupled the proximal end of the housing 24, and four pulleys are coupled to the distal end of the housing 24. Illustratively, a first end 50 of the operating cable 26 is attached to the proximal end 52 of the door 14 as shown in FIGS. 2–5. From the attachment point 62, the operating cable 26 passes around pulleys 66, 68, 70, 72, 74, 76, and 78, respectively, and then through the clamp 60. Pulleys 66, 70, 74, and 78 are rotatably coupled to a bracket 79 that is attached to the distal end 80 of the housing 24, and pulleys 68, 72, and 76 are rotatably coupled to the carriage 40. The location of the clamp 60 is not critical. Preferably, it clamps the operating cable 26 to the housing and does not restrict the necessary movement of the carriage 40.

From the clamp 60, the operating cable 26 passes around pulleys 82, 84, 86, 88, 90, 92, and 94, respectively. The second end 56 of the operating cable 26 is attached to the distal side 58 of the door 14. Pulleys 82, 86, 90, and 94 are rotatably coupled to a bracket 95 that is attached to the proximal end 30 of the housing, and pulleys 84, 88, and 92 are rotatable coupled to the carriage 40.

In operation, it will be seen that as the carriage 40 moves to the right, as shown by FIGS. 2–5 in sequence, six of the segments of the operating cable 26 to the left of the carriage 40 increase in length. Since the operating cable 26 is clamped to the housing 24, the required additional operating cable 26 length is taken from the first end 50 of the operating cable 26 connected to the proximal end 52 of the door 14, and the operating cable 26 pulls the door 14 to the left.

Figure 2:
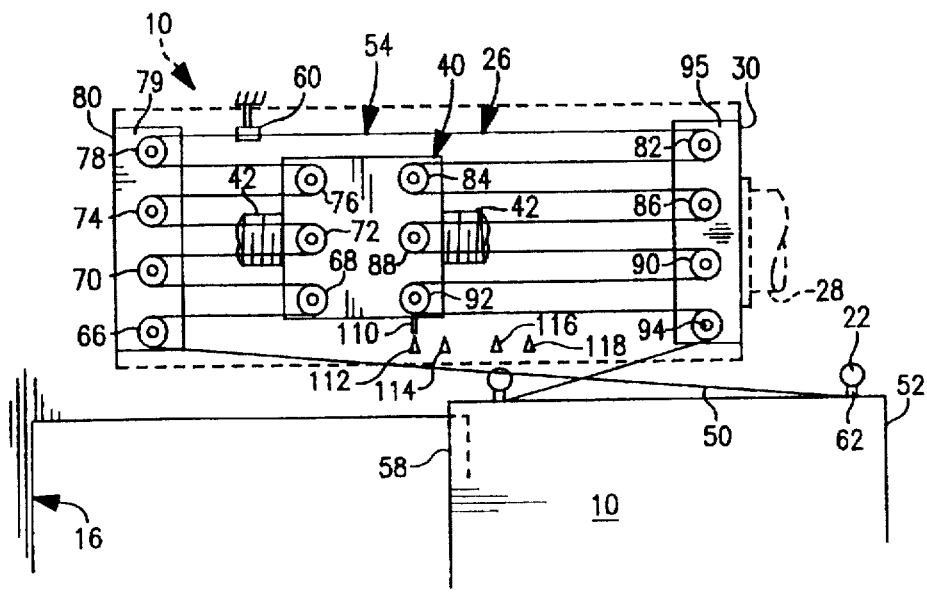
FIG. 2 is a schematic representation of the door positioning assembly of FIG. 1 showing a door in a fully open position, a carriage linked by a cable to a system of pulleys, the cable having two ends appended to the door, and a sensor pin appended to the carriage and positioned to be sensed by a first proximity sensor.

Six of the segments of the operating cable 26 to the right of the carriage 40, as seen in FIG. 2, decrease in length as the carriage 40 moves to the right. Since the operating cable 26 is clamped to the housing 24, the excess length available due to the movement of the carriage 40 to the right is taken up by the second end 56 of the operating cable 26 coupled to the distal side 58 of the door 14, as the door 14 moves to the left.

Of course, as the carriage 40 moves to the left, as seen in FIG. 2, the opposite effect is achieved. Six of the segments of the operating cable 26 to the right of the carriage 40 increase in length, and the required additional operating cable 26 length comes from the second end 56 of the operating cable 26 coupled to the distal side 58 of the door 14, thus pulling the door 14 to the right. Six of the segments of the operating cable 26 to the left of the carriage 40 decrease in length, with the excess length taken up by the first end 50 of the operating cable 26 coupled to the proximal end 52 of the door 14.

It should be noted that the direction of motion of the carriage 40 is always opposite the direction of motion of the door 14, and the magnitude of motion of the carriage 40 is always proportional to that of the door 14. This allows for the position and movement of the door 14 to be monitored by monitoring the position and movement of the carriage 40.

A sensor pin 110 is fixed to the carriage 40 as illustrated in FIGS. 2–5. Each of four proximity switches 112, 114, 116, 118, illustratively mounted beneath the carriage as shown in FIGS. 2–5, provide an electrical signal when the sensor pin 110 is in close proximity to the proximity switch 112, 114, 116, 118. Satisfactory results have been achieved using Allen Bradley Nemothor model number 413IP67 proximity switches and corresponding sensor pins, though it is within the scope of the invention as presently perceived to provide any sensor pin or sensor switch that will result in a suitable signal, as described below, being provided to a signal processor 130, shown in FIGS. 6–12, which can accept the signal and convert it into instructions for the drive motor controller 48.

Figure 3:
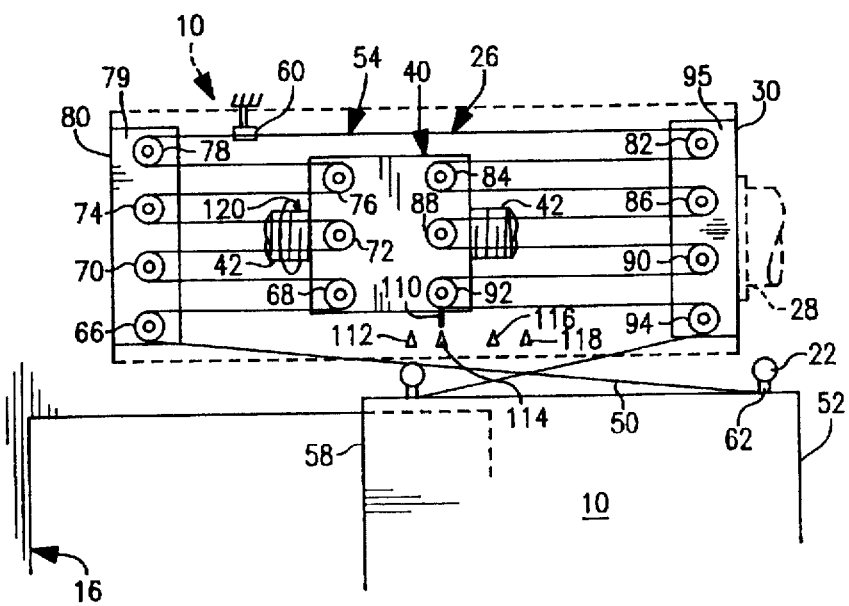
FIG. 3 is a view similar to FIG. 2 showing the door moving toward the fully open position and the carriage positioned so that the sensor pin is sensed by a second proximity switch.
Figure 4:
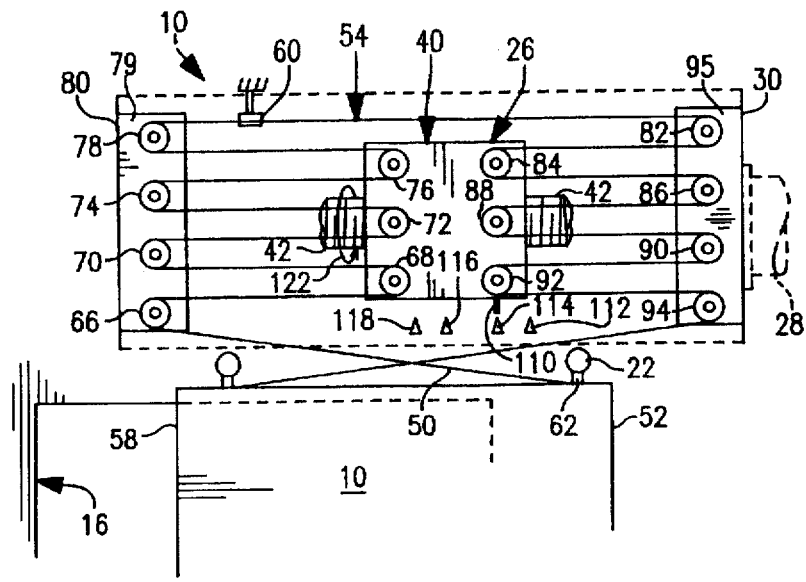
FIG. 4 is a view similar to FIG. 3 showing the door moving toward the fully closed position and the carriage positioned so that the sensor pin is sensed by a third proximity switch.

The open proximity switch 112 is arranged so that the open proximity switch 112 senses the sensor pin 110 and provides a signal to the signal processor 130 when the door 14 is in the fully opened position, as shown in FIGS. 1 and 2. The open decelerate proximity switch 114 is arranged so that the open decelerate proximity switch 114 senses the sensor pin 110 and provides a signal to the signal processor 130 when the door 14 is near the fully open position, as shown in FIG. 3. The close decelerate proximity switch 116 is arranged so that the close decelerate proximity switch 116 senses the sensor pin 110 and provides a signal to the signal processor 130 when the door 14 is near the fully closed position, as shown in FIG. 4. Finally, the closed proximity switch 118 is arranged so that the closed proximity switch 118 senses the sensor pin 110 and provides a signal to the signal processor 130 when the door 14 is in the fully closed position, as shown in FIG. 4. By use of the sensor pin 110 and strategically placed proximity switches 112, 114, 116, 118, the signal processor 130 can monitor the position of the door 14 and provide appropriate instructions to the drive motor controller 48.

Figure 6:
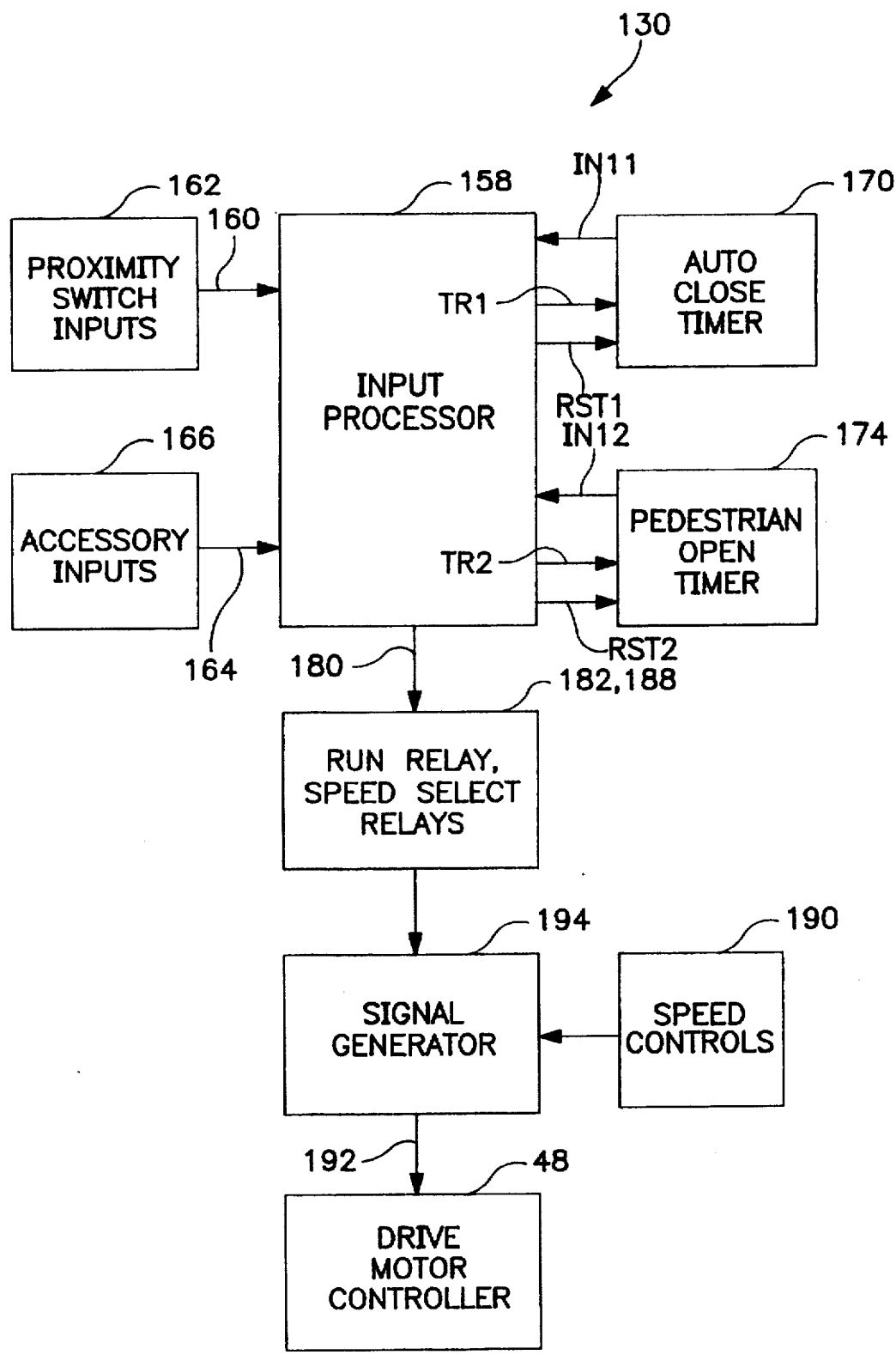
FIG. 6 is a block diagram of a signal processor of the control system in accordance with the present invention showing an input processor receiving input signals and providing output signals to a signal generator that responds by providing instruction signals to a drive motor controller.

The signal processor 130, shown in FIGS. 6–12, accepts electrical signals provided by various electro-mechanical sources and converts the electrical signals into instructions for the drive motor controller 48. A block flow diagram of a preferred embodiment of a signal processor 130 in accordance with the present invention is illustrated in FIG. 6. An input processor 158 receives proximity switch inputs 160 from a proximity switch inputs circuit 162, accessory inputs 164 from an accessory inputs circuit 166, an auto close timing input IN11 from an auto close timer 170, and a pedestrian open timing input IN12 from a pedestrian open timer 174. In turn, the input processor 158 provides an auto close timer reset signal RST1 to the auto close timer 170 and a pedestrian open timer reset signal RST2 to the pedestrian open timer 174.

Figure 11:
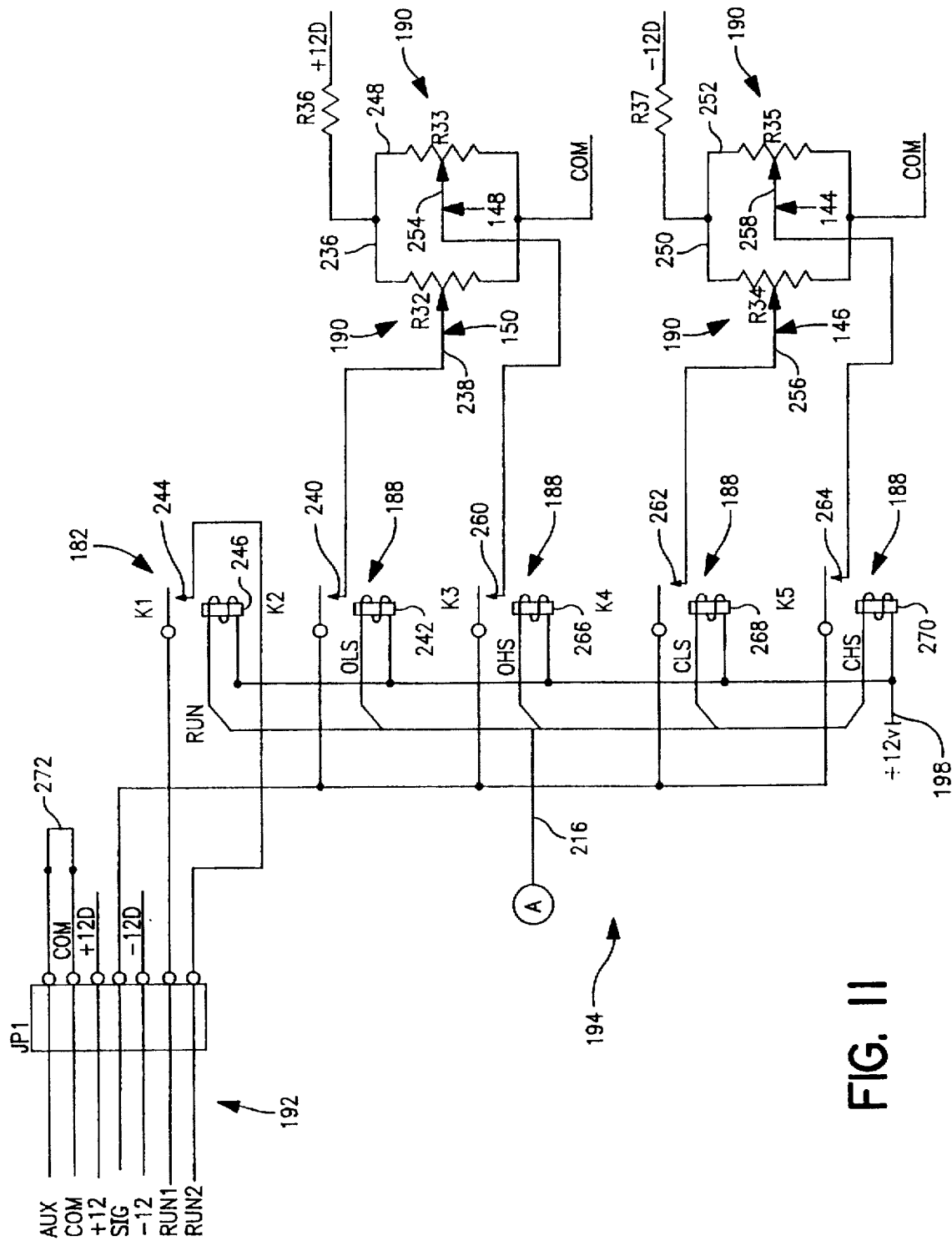
FIG. 11 is a circuit diagram of illustrative relay, speed control, and signal generator circuits of the sisal processor.

In addition, the input processor 158 provides open/close signals 180 that open and close run relays 182 and speed select relays 188. When a relay actuator of a run relay 182 receives an open/close signal 180 from the input processor 158 (a "run signal") relay switch is closed indicating that the drive motor controller 48 is to supply power to the drive motor 28. The amount and polarity of the power provided depends in part upon which speed select relay 188 has been actuated in response to the open/close signals 180 from the input processor 158. The speed select relays 188 cooperate with a speed control circuit 190 including variable resistors included in a close high speed pot 144, a close low speed pot 146, an open high speed pot 148, and an open low speed pot 150 to establish the signal 192 that the signal generator 194 will provide to the drive motor controller 48, as shown in FIGS. 6 and 11.

The sources of signals for the signal processor 130 include proximity switch inputs 160 from the proximity switches 112, 114, 116, 118, and accessory inputs from the motion detector 44, the reverse edge 45, the three-button manual control 46, a pass door limit switch 39 (FIG. 8) which is arranged to indicate whether the pass door 34 is fully closed, and the photo electric switch 63. The preferred pass door limit switch 39 is model ZE3A095 made by Omron Inc., though it is within the scope of the invention as presently perceived to use any suitable limit switch 39.

While the proximity switch inputs 160 are automatically provided by proximity switches 112, 114, 116, 118, the accessory inputs 164 are user input signals generated by user commands such as when a user presses a button 96, 98, 100 on the three-button manual control 46. The signal processor 130 provides controller instructions 180 in response to the user input signals as shown, for example, in FIG. 6. In addition, the signal processor 130 adjusts the instructions provided to the drive motor controller 48 in response to settings provided by the variable resistor pots 140, 142, 144, 146, 148, 150.

Several of the input sources can be classified as stop inputs. These inputs are received from switches having normally closed contacts. The contacts providing stop inputs are connected in series so that activating any one of the contacts will cause the signal processor 130 to instruct the drive motor controller 48 to stop the movement of the door 14. The stop button 96 on the three-button manual control 46, the pass door limit switch 39, and the photo electric switch 63 all provide stop inputs and are all connected in this manner.

Several other of the input sources can be classified as open inputs. These inputs are received from switches having normally open contacts. The contacts providing open inputs are connected in parallel so that activating any one of the contacts will cause the signal processor 130 to instruct the drive motor controller 48 to either open the door 14, or if activated during a close cycle, to stop the movement of the door 14 toward the closed position and then open the door 14 back up. The open button 98 on the three-button manual control 46, the motion detector 44, and the reverse edge 45 all provide open inputs and are all connected in this manner.

The close button 100 on the three-button manual control 46 provides a close input. The close button 100 is a switch having a normally open contact. Activation of the close button 100 causes the signal processor 130 to instruct the drive motor controller 48 to move the door 14 to the fully closed position. If the close input is activated while the door 14 is moving toward the open position, the drive motor controller 48 will be instructed to stop the door 14 and then to move the door 14 to the fully closed position. However, if one of the open inputs is activated simultaneously with the close input, the signal processor 130 ignores the activation of the close input.

The close input can be bypassed by wiring the normally open close input contact closed. When the signal processor 130 receives an open input it will respond by instructing the drive motor controller 48 to open the door 14. As long as one of the open inputs, such as the motion detector 44, signals that an obstruction is present in the opening 18, the signal processor 130 will instruct the drive motor controller 48 to keep the door open. As soon as the open signal goes away, the signal processor 130 will instruct the drive motor controller 48 to close the door 14.

An auto close timer 152 which is activated when the close input contact is wired closed provides an adjustable time delay which causes the signal processor 130 to instruct the drive motor controller 48 to delay closing the door 14 for a specified period of time after the open signal goes away. Adjustment of the auto close pot 142 will adjust this delay time.

The opening 18 is typically very wide. It may be advantageous at times to open the door 14 a smaller amount to facilitate pedestrian traffic without having the door 14 in the fully open position. A pedestrian button 102 (FIG. 8) may be provided that, when pressed, causes the signal processor 130 to instruct the drive motor controller 48 to open the door 14 to a position between the fully opened and the fully closed positions. The pedestrian button 102 is an open input, however it cooperates with a pedestrian timer 154 to limit the time that the driver motor controller 48 is instructed to move the door 14 toward the open position. Adjustment of the pedestrian open pot 140 will adjust the time that the driver motor controller 48 moves the door.14, thereby adjusting the extent that the door 14 moves when the pedestrian button 102 is pressed.

The proximity switches 112, 114, 116, 118 cooperate with the speed pots 144, 146, 148, 150 to provide the signal processor 130 with information required to instruct the drive motor controller 48 for movement of the door 14 during operation when there are no interruptions due to activated accessory inputs 166. If the door 14 is in the open position, the sensor pin 110 is being sensed by the open proximity switch 112 as shown in FIG. 2, thereby informing the signal processor 130 that the door 14 is in the open position.

If the signal processor 130 receives a close input, the signal processor 130 instructs the drive motor controller 48 to provide full power to the drive motor 28. The drive motor 28 rotates the lead screw 42 in a door-closing direction 120, shown in FIG. 3, as quickly as possible until the lead screw 42 reaches a predetermined close fast rotation speed established by the setting of the close high speed pot 144, at which point the carriage 40 and, as a result, the door 14 translate at their close high speeds.

As the carriage 40 translates, the sensor pin 110 is eventually positioned in the proximity of the close decelerate proximity switch 116 as shown in FIG. 4. When the signal processor 130 determines that the close decelerate proximity switch 116 senses the sensor pin 110, the signal processor 130 instructs the drive motor controller 48 to reduce the power provided to the drive motor 28 and to regeneratively brake, using the kinetic energy of the door 14 to slow the drive motor 28 to the desired speed. Once the drive motor 28 slows to the predetermined close slow rotation speed established by the setting of the close low speed pot 146 and the lead screw 42 slows to its predetermined close low speed, the door 14 translates at the close low speed or creep speed toward the closed position.

Figure 5:
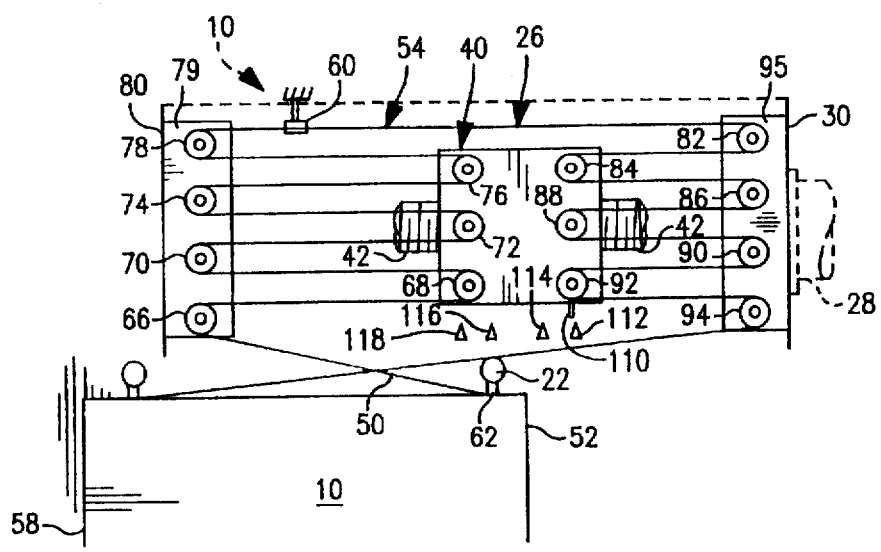
FIG. 5 is a view similar to FIG. 4 showing the door in the fully closed position and the carriage positioned so that the sensor pin is sensed by a fourth proximity switch.

As the carriage 40 translates, the sensor pin 110 is eventually positioned in the proximity of the closed proximity switch 116 as shown in FIG. 5. When the signal processor 130 determines that the closed proximity switch 116 senses the sensor pin 110, the signal processor 130 instructs the drive motor controller 48 to provide no power to the drive motor 28 thereby halting the rotation of drive motor 28, the lead screw 42, the carriage 40, and consequently halting the translation of the door 14, bringing the door 14 to rest in the closed position with the door 14 in front of the opening 18.

If, after bringing the door 14 to rest in the closed position, the signal processor 130 receives an open input, the signal processor 130 instructs the drive motor controller 48 to provide full power to the drive motor 28. However, the polarity of the potential is opposite that provided when closing the door 14 above, so that the drive motor 28 rotates in a door-opening direction 122 shown in FIG. 4. The drive motor 28 rotates the lead screw 42 as quickly as possible until the lead screw 42 reaches a predetermined open fast rotation speed established by the setting of the open high speed pot 148, at which point the carriage 40 and, as a result, the door 14 translate at their open high speeds.

As the carriage 40 translates, the sensor pin 110 is eventually positioned in the proximity of the open decelerate proximity switch 114 as shown in FIG. 3. When the signal processor 130 determines that the open decelerate proximity switch 114 senses the sensor pin 110, the signal processor 130 instructs the drive motor controller 48 to reduce the power provided to the drive motor 28 and to regeneratively brake, using the kinetic energy of the door 14 to slow the drive motor 28 to the desired speed. Once the drive motor 28 slows to the predetermined open slow rotation speed established by the setting of the open low speed pot 150, the lead screw 42 slows to its predetermined open low speed, and the door 14 translates at the open low speed or creep speed toward the open position.

As the carriage 40 translates, the sensor pin 110 is eventually positioned in the proximity of the open proximity switch 112 as shown in FIG. 5. When the signal processor 130 determines that the open proximity switch 112 senses the sensor pin 110, the signal processor 130 instructs the drive motor controller 48 to provide no power to the drive motor 28, thereby halting the rotation of drive motor 28 and the lead screw 42 so that the carriage 40 and consequently the door 14 are brought to rest in the open position having the door 14 away from the opening 18.

The predetermined fast and creep speeds can be adjusted by adjusting the close high speed pot 144, the close low speed pot 146, the open high speed pot 148, and the open low speed pot 150. Adjustment of the close high speed pot 144, for example, adjusts the resistance of variable resistor R35, shown in FIG. 11, which in turn adjusts the instruction sent from the signal processor 130 to the drive motor controller 48 when switch 262 of the speed select relay 188 is closed in response to an instruction from the input processor 158.

Likewise, adjustment of the close low speed pot 146 adjusts the resistance of variable resistor R34, adjustment of the open high speed pot 148 adjusts the resistance of variable resistor R33, and adjustment of the open low speed pot 150 adjusts the resistance of variable resistor R32. Adjustment of each of these variable resistors R32, R33, R34 adjusts the instructions sent from the signal processor 130 to the drive motor controller 48, thereby adjusting the travel speed of the door 14.

If the door 14 is in the open position having the sensor pin 110 in close proximity to the open proximity switch 112, and the signal processor 130 receives an open input, the signal processor 130 will note the signal from the open proximity switch 112 indicating that the door 14 is already in the open position. As a result, the signal processor 130 will not instruct the drive motor controller 48 to supply power to the drive motor 28. Likewise, if the door 14 is in the closed position and the signal processor 130 receives a close input, the signal processor 130 will not instruct the drive motor controller 48 to supply power to the drive motor 28.

However, if the door 14 is not moving but is located at a position other than the open or closed position, so that the sensor pin 110 is not in the proximity of either the open proximity switch 112 or the closed proximity switch 118, and the signal processor 130 receives an open input or a close input, the signal processor 130 will not instruct the drive motor controller 48 to supply full power to the drive motor 28. If the door 14 is positioned such that the sensor pin 110 is between the open decelerate proximity switch 114 and the close decelerate proximity switch 116, then running at full speed would present no problem since the sensor pin 110 would eventually pass either the open decelerate proximity switch 114 or the close decelerate proximity switch 116 at which the signal processor 130 would instruct the drive motor controller 48 to reduce the power to achieve the specified creep speed.

However, if the sensor pin 110 is between the open proximity switch 112 and the open decelerate proximity switch 114 and the signal processor 130 receives an open input, sensor pin 110 will not pass another proximity switch until the door 14 is in the open position. Rather than risk having the drive motor controller 48 drive the drive motor 28 to the open high speed in this instance, the signal processor 130 is programmed to instruct the drive motor controller 48 to drive the drive motor 28 at the creep speed. Likewise, when the signal processor 130 receives a close input and the sensor pin 110 is not sensed by either of the open proximity and the closed proximity switches 112, 118, the signal processor 130 is programmed to instruct the drive motor controller 48 to drive the drive motor 28 toward the closed position at the creep speed.

Figure 7:
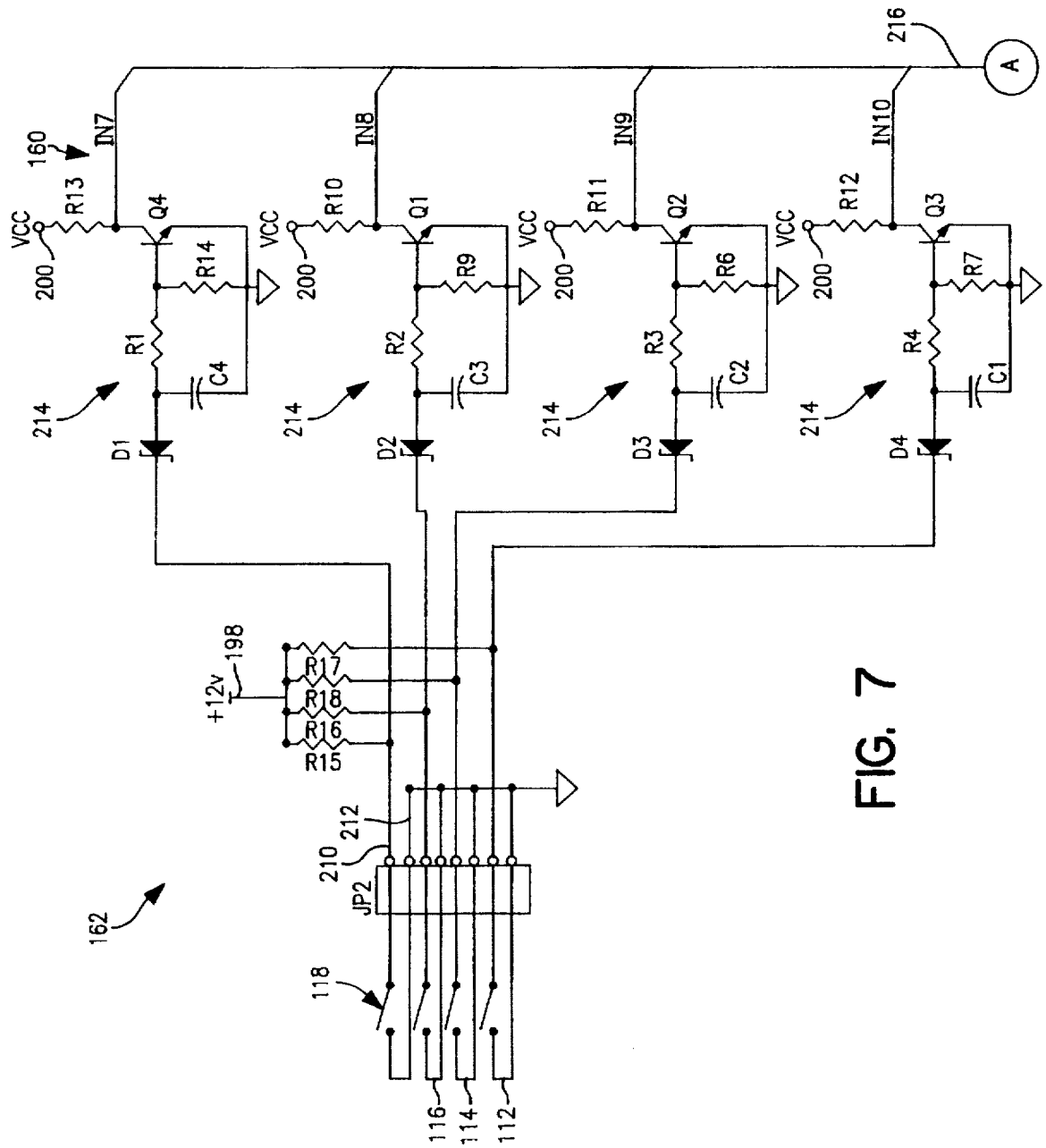
FIG. 7 is a circuit diagram of an illustrative proximity input circuit of the signal processor.

An illustrative embodiment of the proximity switch inputs circuit 162 shown in FIG. 7 includes four parallel circuits, one circuit corresponding to each proximity switch 112, 114, 116, 118. Though only one circuit will be described below, all four circuits illustratively have the same structure. The closed proximity switch 118 includes a first lead 210 connected through resistor R15 to a 12 volt power supply arranged to maintain the first lead 210 at a potential of 12 volts when the closed proximity switch 118 is open. A second lead 212 is connected to ground. When the sensor pin 110 is in the proximity of the closed proximity switch 118, the closed proximity switch 110 closes and the potential of the first lead 210 is reduced.

A proximity switch signal converting circuit 214 connected to the first lead 210 of each proximity switch 112, 114, 116, 118, responds to the potential of the first lead 210 to provide the proximity input signal 160 for the input processor 158. The signal converting circuit 214 connected to the first lead 210 includes a zener diode D1 having a cathode terminal connected to the first lead 210 and an anode terminal connected to the base terminal of transistor Q4 through resistor R1. The collector lead of transistor Q4 is connected to ground and the emitter lead provides the input signal IN7.

The input signal for the close proximity switch 118 is input signal IN7, and the input signals for the other proximity switches 116, 114, 112 are IN8, IN9, IN10. The input signals IN7, IN8, IN9, IN10 travel along main information line 216 to the input processor 158.

Figure 8:
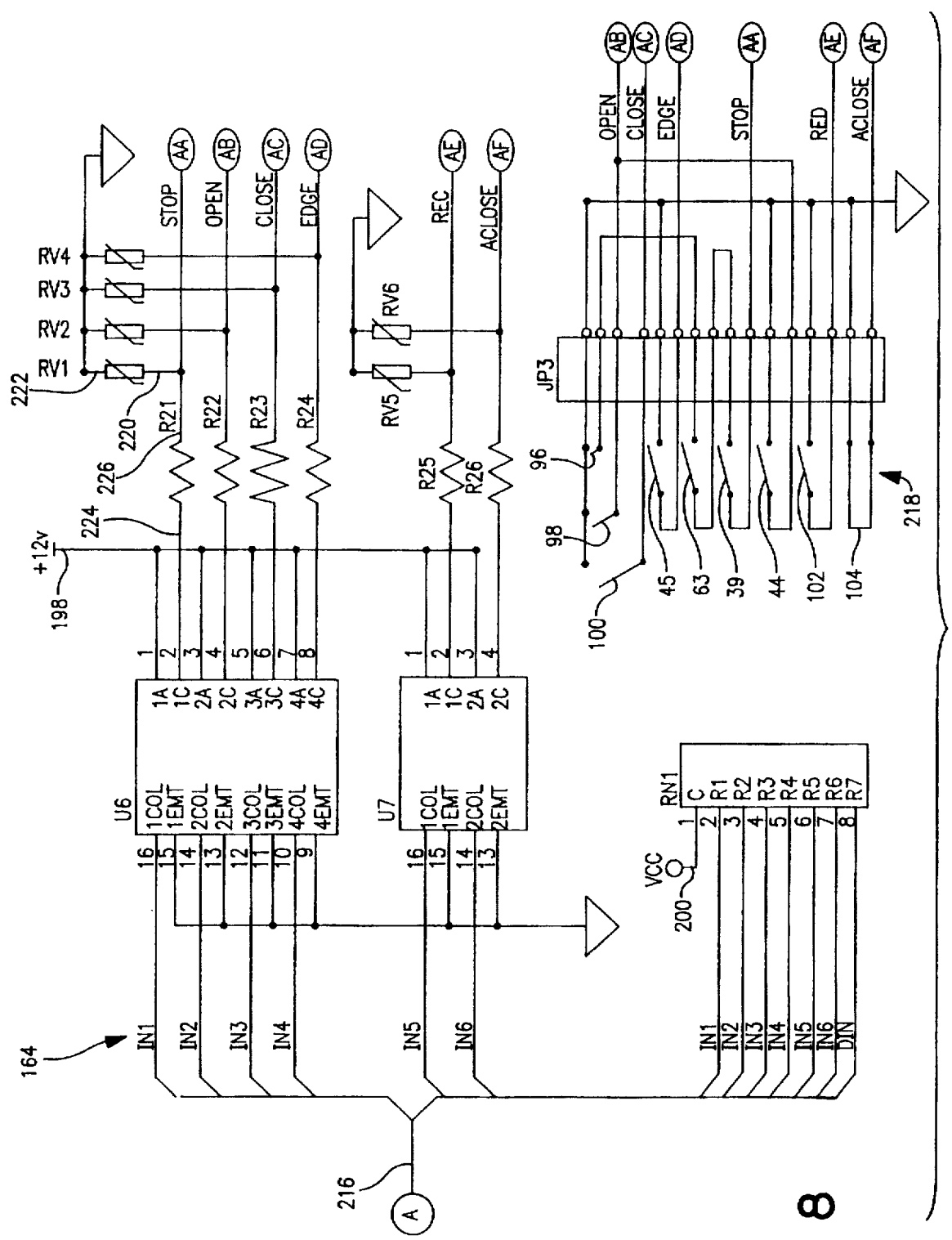
FIG. 8 is a circuit diagram of an illustrative auxiliary input circuit of the signal processor.

An illustrative embodiment of the accessory inputs circuit 166 shown in FIG. 8 receives signals from the accessory input switches 218 and converts them to accessory input signals 164 including input signals IN1, IN2, IN3, IN4, IN5, IN6, DIN that are transmitted to the input processor 158 along the main information line 216. Among the accessory input switches 218 are the open inputs which include inputs from all of the normally open accessory input switches 218. The open inputs include the open button 98 of the three-button manual control 46, the motion detector 44, the reverse edge 45, and the pedestrian open button 102.

Stop inputs include the inputs received from the normally closed accessory input switches 218. The close inputs include the stop button 96 of the three-button manual control 46, the pass door limit switch 39, and the photo electric switch 63. A close input is generated by the close button 100 of the three-button manual control 46. The close button 100 is normally open. If one of the open inputs is closed when a close input is received, the close input will be ignored. As long as an open input such as the motion detector 44 is closed, the door 14 will remain open. The auto close jumper 104 activates the auto close timer circuit 170, shown in FIG. 11. Once all of the open input switches are open, the auto close timer circuit is activated to provide a delay time before the input processor 158 responds to the close input. The door 14 will close after the delay time established by the auto close timer circuit 170 has elapsed.

The open inputs are connected in parallel and the close inputs are connected in series as illustrated in FIG. 8. The result is that six leads from the accessory input switches, a stop lead AA, an open lead AB, a close lead AC, an edge lead AD, aped lead AE and an aclose lead AF carry signals that are received by the accessory inputs circuit 166. The stop lead AA is connected to a first terminal 220 of a protection device RV, a second terminal 222 of which is connected to ground. The stop lead AA is further connected to a first terminal 226 of resistor R21. A second terminal 224 of resistor R21 is connected to pin 2 of signal converted U6. Likewise, the open lead AB, the close lead AC, and the edge lead AD are connected to protection devices RV2, RV3, and RV4, resistors R22, R23, and R24, and to pins 4, 6, and 8 of signal converter U6, respectively.

Similarly, the ped lead AE is connected to a protection device RV5 and to a first terminal 228 of resistor R25. However, rather than being connected to signal converter U6, the second terminal 230 of resistor R25 is connected to pin 2 of signal converter U7. Likewise, the aclose lead AF is connected to protection device RV6, resistor R26, and to pin 4 of signal converter U7. Satisfactory results have been achieved using General Electric GE 47ZA1 metal oxide varistor protection devices, and signal converters U6, U7 model PC847 processors made by Sharp Corp. The signal converters U6, U7 provide accessory inputs signals 164 including input signals IN1, IN2, IN3, IN4, IN5, IN6 that are transmitted to the input processor 158 along the main information line 216.

Input signals IN1, IN2, IN3, IN4, IN5, IN6, IN7 are also received by the pull-up resistor RN1. In response, the pull-up resistor RN1 provides the input signal DIN to the input processor 158 along the main information line 216. Satisfactory results have been achieved by using a Dale Resistor Network model 101–222 2.2K pull-up resistor.

Figure 9:
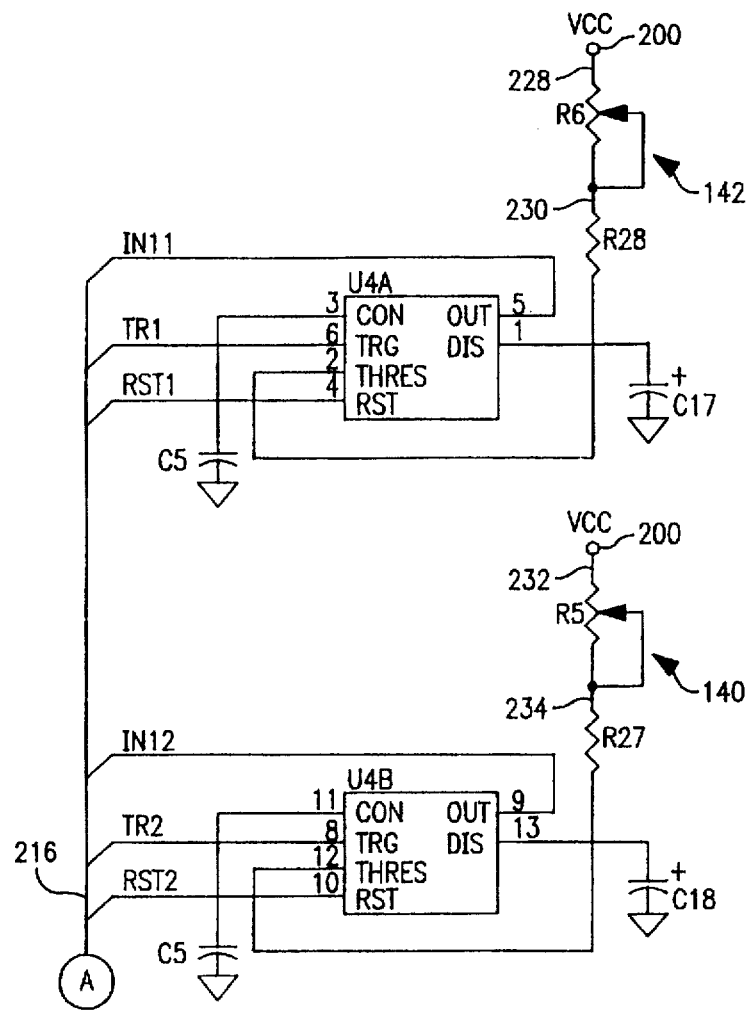
FIG. 9 is a circuit diagram of illustrative auto close timer and pedestrian open timer circuits of the signal processor.

An illustrative embodiment of the auto close timer circuit 170 and the pedestrian open timer circuit 174 are shown in FIG. 9. The auto close timer circuit 170 includes variable resistor R6 of the auto close pot 142. The resistor R6 has a first terminal 228 connected to the Vcc power supply 200 and a second terminal 230 connected to resistor R28 which in turn is connected to capacitor C17, terminal 1 of auto close timer U4A, and terminal 2 of auto close timer U4A. The auto close timer U4A receives a start signal TR1 from the input processor 158 and a reset signal RST1 from the signal processor 158. The auto close timer U4A provides an auto close timing input IN11 to the input processor 158 along the main information line 216.

The structure of the pedestrian open timer circuit 174 is similar to that of the auto close timer circuit 170. A resistor R5 of pedestrian open pot 140 has a first terminal 232 connected to the Vcc power supply 200 and a second terminal 234 connected to resistor R27 which in turn is connected to capacitor C16, pin 13 of pedestrian open timer U4B, and pin 12 of pedestrian open timer U4B. The pedestrian open timer U4B receives a start signal TR2 from the input processor 158 and a reset signal RST2 from the signal processor 158. The pedestrian open timer U4B provides a pedestrian open timing input IN11 to the input processor 158 along the main information line 216. Satisfactory results have been achieved using a Motorola model number LM556 dual timer for both U4A, U4B.

Figure 10:
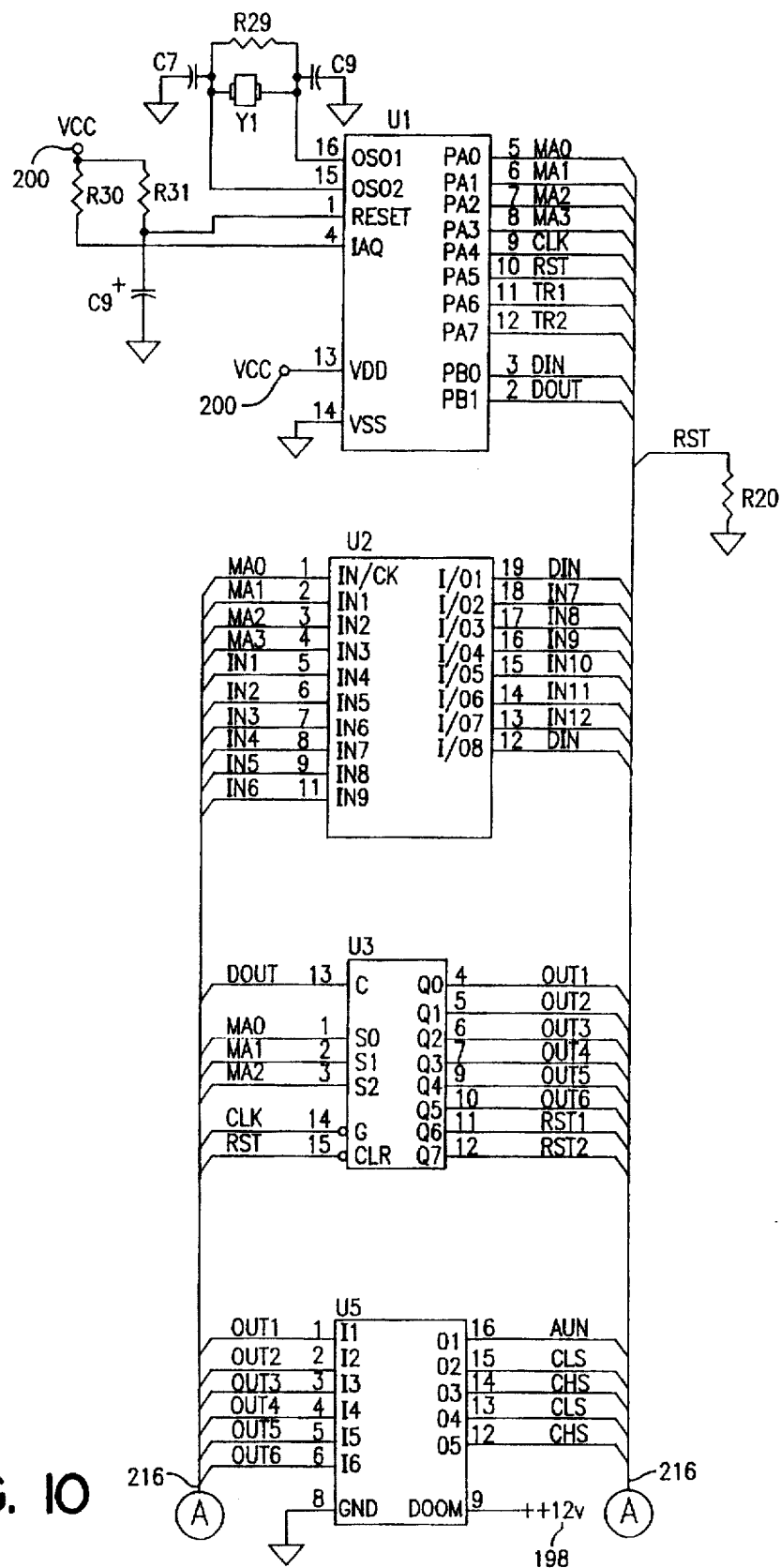
FIG. 10 is a circuit diagram of an illustrative input processor circuit of the signal processor.

An illustrative embodiment of the input processor 158 shown in FIG. 10 receives input signals IN1, IN2, IN3, IN4, IN5, IN6, IN7, IN8, IN9, IN10, IN11, IN12, and DIN that are transmitted to the input processor 158 along the main information line 216. The input processor 158 responds by providing open/close signals 180, including open/close signals RUN, OLS, OHS, CLS, CHS to the signal generator circuit 194. The source code for the input processor 158 is contained in Exhibit I in the program labelled STANDARD version 1.02 and in Exhibit 2 in the program labelled STANDARD WITH PED OPTION version 1.02, herein incorporated by reference.

The input processor 158 includes a programmable logic part U2, a microprocessor U1, and a demultiplexer U3. The devices U1, U2, and U3 are interconnected along the main information line 216 so that programmable logic part U2 receives all of the input signals 160, 164, IN11, IN12 and in response provides U2 response signals MA0, MA1, MA2 to processor U3, and U2 response signals MA0, MA1, MA2, MA3 to processor U1. Microprocessor U1 in response provides the auto close timer start signal TR1 and the pedestrian open timer start signal TR2 when appropriate as well as providing U1 response signals CLK, DOUT, RST to processor U3. Demultiplexer U3 in response provides auto close timer reset signal TR1 and pedestrian open timer reset signal TR2 when appropriate, as well as providing U3 response signals OUT1, OUT2, OUT3, OUT4, OUT5, OUT6. Satisfactory results have been achieved using a Motorola microprocessor U1 model 68HC705K1, an ICT programmable logic part U2 model P18CV8, and a Motorola demultiplexer U3 model 74HC259.

The input processor further includes darlington array U5 that receives the U3 response signals OUT1, OUT2, OUT3, OUT4, OUT5, OUT6 and in response provides U5 response signals RUN, OLS, OHS, CLS, CHS. The U5 response signals RUN, OLS, OHS, CLS, CHS are the open/close signals 180 that activate the run relay 182 and the speed select relays 188 of the signal generator circuit 194. Satisfactory results have been achieved using a Motorola darlington array U5 model ULN2003.

An illustrative embodiment of the circuits including the run relay 182, speed select relays 188, speed controls 190, and the signal generator 194 is shown in FIG. 11. The speed controls 190 include the close high speed pot 144, the close low speed pot 146, the open high speed pot 148, and the open low speed pot 150. The circuits 188, 190, 194 that provide the instruction to the drive motor controller to open the door 14 at the creep speed, or the open low speed instruction, will be described below. The circuits 188, 190, 194 that provide the open high speed, close low speed, and close high speed instructions are similar.

The speed control 190 includes the open low speed pot 150 having variable resistor R32 with a terminal 236 connected to 12 volt power supply +12D through resistor R36. A second terminal 238 of variable resistor R32 is connected to relay switch 240. Relay activator 242 closes the normally open relay switch 240 when the relay activator 242 receives the U5 response signal OLS from the input processor 158 provided along the main information line 216.

Once the relay switch 240 is closed, the open low speed instruction 192 is provided to a signal terminal SIG of the output connector JP1 that is connected to the drive motor controller 48. The instruction 192 provided to the drive motor controller 48 can be varied by varying the resistance of the variable resistor R32. Advantageously, an operator wishing to adjust the open low speed travel speed of the door 14 simply adjusts the open low speed pot 150, thereby adjusting the signal 192 provided to the drive motor controller 48. The drive motor controller 48 will respond to the adjusted signal 192 by adjusting the rotational speed of the drive motor 28 thereby adjusting the travel speed of the door 14.

The illustrative circuits 188, 190, 194 that provide the instructions to the drive motor controller to open the door 14 at the open high speed, close low speed, and close high speed instructions are similar to those described above relative to the open low speed instruction. The speed control 190 further includes the open high speed pot 148, the close low speed pot 146, and the close high speed pot 144, all having variable resistors R33, R34, R35 having terminals 248, 250, 252 connected to 12 volt power supplies +12D, −12D through resistors R36, R37. The variable resistors R34, R35 associated with the close low speed and close high speed instructions are connected to the negative 12 volt power supply −12D and the variable resistor R33 associated with the open high speed instruction is connected to the positive 12 volt power supply +12D.

Second terminals 254, 256, 258 of variable resistors R33, R34, R35 are connected to relay switches 260, 262, 264. Relay activators 266, 268, 270 close the normally open relay switches 260, 262, 264 when the relay activators 266, 268, 270 receive the U5 response signals OHS, CLS, CHS from the input processor 158 provided along the main information line 216. Once the relay switches 260, 262, 264 are closed, the speed instructions 192 are provided to the signal terminal SIG of the output connector JP1 that is connected to the drive motor controller 48.

The drive motor controller 48 is configured so that simply receiving a signal 192 from the speed select relays 188 will not cause the drive motor controller 48 to supply power to the drive motor 28. A run relay switch 244 of the run relay 182 must be activated to close a circuit between a first run terminal RUN1 and a second run terminal RUN2 on the output connector JP1 before the drive motor controller 48 will supply power to the drive motor 28. Relay activator 246 closes the normally open run relay switch 244 when the relay activator 246 receives the U5 response signal RUN from the input processor 158 provided along the main information line 216. Once the run relay switch 244 and one of the relay switches 240 of the speed select relays 188 are closed the drive motor controller 48 will respond by providing power to the drive motor 28.

A jumper 272 is provided between the auxiliary speed reference terminal AUX and the common terminal COM of the output connector JP1. The jumper 272 is required when the drive motor controller 48 used is one of the Saftronics DF8 Plus series DC motor controllers (Saftronics controller). The jumper 272 is provided in the terminals AUX, COM in lieu of providing an auxiliary speed reference input that the Saftronics controllers use to trim a main speed reference internal to the Saftronics controller.

Figure 12:
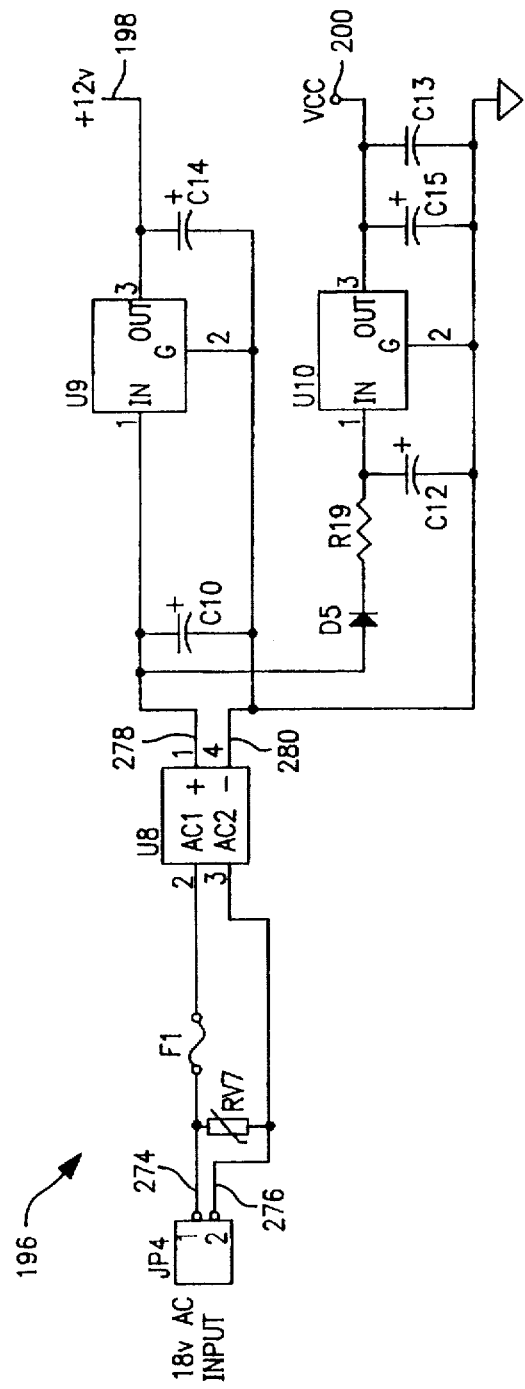
FIG. 12 is a circuit diagram of an illustrative power supply circuit of the signal processor.

An illustrative embodiment of a power supply circuit 196 accepts an 18 volt alternating current input 18V AC at input connector JP4 and provides a first constant voltage power source 198 maintained at 12 volts and a second constant voltage power source 200 maintained at Vcc as shown in FIG. 12. The first and second constant voltage power sources 198, 200 each supply power to the various circuits of the signal processor 130 as shown in FIGS. 7–11.

The illustrative power supply circuit includes a first input terminal 274 connected to a protection device RV7 and fuse F1. The fuse F1 is connected to the AC-to-DC converter U8. A second input terminal 276 is also connected to the protection device RV7 and to AC-to-DC converter U8. A negative output pin 278 of the AC-to-DC converter U8 is connected to ground, and both a positive output pin 278 of the AC-to-DC converter U8 and the negative output pin 280 are connected to a voltage regulator U9 that responds to provide the 12 volt constant voltage power source 198. The positive output pin 278 and the negative output pin 280 are also connected to a voltage regulator U10 that responds to provide the Vcc constant voltage power source 198. Satisfactory results have been achieved using a Diodes Inc. AC-to-DC converter U8 model KBP04M, a Motorola voltage regulator U9 model 7812CT/with 6073, and a Motorola voltage regulator U10 model 7805CT/with 6073.

Advantageously, the control system 12 in accordance with the present invention provides for a rapid response to user commands for opening and closing of moving doors. The faster the open/close function of a door system, the greater the savings. In addition, the use of the Saftronics regenerative controller further reduces energy consumption as the Saftronics controller recovers the energy generated by the movement of the door 14 for use when slowing and stopping the door 14.

In addition, the control system 12 can include solid state microprocessors configured to manage the drive motor controller 48, resulting in a minimal amount of energy consumption due to the control system. Replacing additional mechanical "add-ons," the control system 12 provides flexibility to control opening and closing speed, operating speed, ramping, limit switches, motion sensors and partial opening by merely adjusting variable resistor pots.

Although the invention has been described in detail with reference to certain preferred embodiments, variations and modifications exist within the scope and spirit of the invention as described and defined in the following claims.

Express Mail No. RB509572371

; STANDARD version 1.02

;************************************************************

```
TEMPPA    EQU      $00E0
TSCR      EQU      $0008
DDRA      EQU      $0004
DDRB      EQU      $0005
PORTA     EQU      $0000
PORTB     EQU      $0001
INPUTL    EQU      $00E1
INPUTH    EQU      $00E2
OUTPUT    EQU      $00E3
TEMPREG   EQU      $00E4
TEMPCTR   EQU      $00E5
STATUS    EQU      $00E6
COPR      EQU      $03F0
```

;************* START *********************

```
          ORG      $0200

;SET-UP REG
RESET     LDA      #$FF
          STA      DDRA     ;ALL OUTPUTS
          LDA      #$02
          STA      DDRB     ;BIT 0 =INPUT   BIT 1 OUTPUT
          LDA      #$F0
          STA      PORTA    ;SET UP PORT A
          STA      TEMPPA   ;STORE IN TEMP REG
          LDA      #$1C
          STA      TSCR     ;ENABLE RTI SET RATE TO 8.2 MS
          LDA      #$00
          STA      OUTPUT   ;SET UP "U3" OUTPUTS
          STA      INPUTL   ;TEMP NOT REQUIRED TO RUN
****************
          STA      INPUTH   ; "                              "
          STA      TEMPREG  ; "
          STA      TEMPCTR  ; "*********************************"
     STA  STATUS
          LDX      #$FF     ;LOADS FF INTO INDEX REG.
          SWI               ;RUN INTERUPT ROUTINE TO UPDATE OUTPUTS
```

EXHIBIT 1

```
        CLI             ;AND INPUT REGISTERS
        JMP     MODETST

;***************START*************************
;THIS ROUTINE WILL TEST FOR SWITCHES PRESSED OPEN & CLOSE IF
;BOTH ARE DETECTED IT WILL PUT SYSTEM INTO AUTO TEST MODE.

MODETST BRSET    1,INPUTL,NORM  ;TEST OPEN SWITCH
     BRSET    2,INPUTL,NORM  ;TEST CLOSE SWITCH
     BSET 6,STATUS
RELEASE BRCLR    1,INPUTL,RELEASE  ;TEST OPEN SWITCH
     BRCLR    2,INPUTL,RELEASE  ;TEST CLOSE SWITCH
     BRA START
NORM BCLR 6,STATUS

START   JSR     RPEDTMR
     BRCLR    0,INPUTL,GOON  ;TEST STOP SWITCH
        JMP     STOPB   ;STOP DOOR
GOON       BRCLR    6,STATUS,TOPEN ;TEST FOR AUTO TEST MODE
     JMP AMODE      ;GO TO AUTO MODE
TOPEN      BRSET    1,INPUTL,NOPEN ;TEST OPEN SWITCH
        BRCLR    2,INPUTL,START  ;WILL LOOP UNTILL CLOSE SWITCH
OPENS
        JMP     OPEN    ;OPEN ROUTINE
NOPEN   BRSET   2,INPUTL,NOCLOSE   ;TEST CLOSE SWITCH
        BRCLR   1,INPUTL,START  ;WILL LOOP UNTILL OPEN SWITCH
OPENS
        JMP     CLOSE   ;CLOSE ROUTINE
NOCLOSE BRSET   4,INPUTL,NOPED ;TEST PED SWITCH
        NOP                    ;PED OPEN ROUTINE (THIS IS SET TO
"nop"ON
                ;NON PED OPTION SOFTWARE)
NOPED   BRCLR 5,INPUTL,YAUTO ;TEST AUTO SWITCH
     JSR RSTATUS    ;RESET AUTO CLOSE STATUS
        JMP     START
YAUTO   JMP     AUTOCL ;******************************************
STOPB   JSR     STOP
     JSR RSTATUS    ;RESET STATUS FOR AUTO CLOSE ROUTINE
        JMP     START ;*************AUTO TEST MODE*****************
;THIS ROUTINE WILL CYCLE THE DOOR OPEN AND CLOSED UNTILL
;POWER IS REMOVED FROM THE SYSTEM AMODE      BRCLR    6,INPUTL,GOCLOSE    ;TEST DOOR CLOSED PROX
     JMP OPEN
GOCLOSE    JMP CLOSE ;******************************************
OPEN    JSR     RSTATUS  ;RESET STATUS FOR AUTO CLOSE
     BRCLR   1,INPUTH,NOTOPEN      ;TEST OPEN DOOR PROX
        JMP     START   ;GO TO START IF ALREADY OPEN
```

```
NOTOPEN  BRCLR    6,INPUTL,DORNC   ;TEST FOR DOOR CLOSED
         JSR      OPENHS    ;OPEN HIGH SPEED
         BRA      TESTLP
DORNC    JSR      OPENLS    ;OPEN LOW SPEED
TESTLP   BRCLR    7,INPUTL,STAYSL  ;STAY SLOW IF DECEL PROX NOT
ACTIVE
         JSR      OPENHS    ;GO TO HIGH SPEED WHEN CLOSE DECEL PROX
IS TRUE
STAYSL   BRCLR    0,INPUTL,NEGSTOP         ;TEST STOP SWITCH
         JMP      START     ;THIS WILL JUMP TO START ROUTINE AND WILL
DETECT
NEGSTOP  BRSET    2,INPUTL,NOCL            ;STOP BUTTON PRESSED
         JSR      STOP      ;TEST CLOSE SWITCH
         JMP      START
NOCL     BRCLR    0,INPUTH,NODET   ;TEST FOR OPEN DECEL PROX
         JSR      OPENLS    ;CHANGE TO LOW SPEED
NODET    BRCLR    1,INPUTH,PEDSW   ;TEST OPEN DOOR PROX
         JMP      STOPB     ;WILL STOP DOOR AND JMP TO START
PEDSW      BRCLR    1,STATUS,TESTLP ;TEST FOR PED OPTION ACTIVE
      BRCLR    4,INPUTL,TESTLP ;TEST AND BRANCH IF PED SW IS
ACTIVE
      BRSET    3,INPUTH,TESTLP ;TEST AND BRANCH IF TIMER IS
ACTIVE
         JMP STOPB     ;STOP DOOR AND JUMP TO START
;***************************************************************
;START OF CLOSE ROUTINE

CLOSE    JSR      RSTATUS          ;RESET STATUS FOR AUTO CLOSE
ROUTINE
CLOSNS     BRCLR    6,INPUTL,CLOSE1 ;TEST FOR DOOR ALREADY CLOSED
         JMP      START            ;DOOR IS ALREADY CLOSED
CLOSE1   BRCLR    1,INPUTH,CLOSE2  ;TEST FOR DOOR OPEN SIGNAL
         JSR      CLOSEHS          ;CLOSE AT HIGH SPEED
         BRA      RELOOP
CLOSE2   JSR      CLOSELS ;CLOSE LOW SPEED
RELOOP   BRCLR    0,INPUTH,CLOSE3  ;CHECK OPEN DECEL PROX
         JSR      CLOSEHS
CLOSE3   BRCLR    0,INPUTL,CLOSE4  ;TEST FOR STOP BUTTON
         JMP      START            ;THIS WILL STOP THE DOOR
CLOSE4   BRSET    3,INPUTL,CLOSE5  ;TEST EDGE SWITCH
         JSR      STOP
         JMP      OPEN
CLOSE5   BRSET    1,INPUTL,CLPED   ;TEST FOR OPEN SWITCH
STPCLS   JSR      STOP
         JMP      START    ;WILL REOPEN DOOR IN "START" ROUTINE
 CLPED     BRCLR    4,INPUTL,STPCLS ;TEST FOR PED OPEN ACTIVE
      BRCLR    7,INPUTL,CLOSE7  ;TEST FOR CLOSE DECEL PROX
         JSR      CLOSELS          ;SWITCH TO LOW SPEED
CLOSE7   BRCLR    6,INPUTL,RELOOP  ;TEST FOR DOOR CLOSED PROX
         JMP      STOPB            ;STOP DOOR

;********** DRIVE CONTROL ROUTINES ***************
```

```
OPENLS  LDA     OUTPUT          ;LOAD CONTENTS OF OUTPUT
        AND     #$E0            ;CHANGE BITS 0-4 TO 0
        ORA     #$03            ;TURN ON RUN & OPEN LOW SPEED
        STA     OUTPUT
        RTS

OPENHS  LDA     OUTPUT          ;LOAD CONTENTS OF OUTPUT
        AND     #$E0            ;CHANGE BITS 0-4 TO 0
        ORA     #$05            ;TURN ON RUN & OPEN HIGH SPEED
        STA     OUTPUT
        RTS

CLOSELS LDA     OUTPUT          ;LOAD CONTENTS OF OUTPUT
        AND     #$E0            ;CHANGE BITS 0-4 TO 0
        ORA     #$09            ;TURN ON RUN & CLOSE LOW SPEED
        STA     OUTPUT
        RTS

CLOSEHS LDA     OUTPUT          ;LOAD CONTENTS OF OUTPUT
        AND     #$E0            ;CHANGE BITS 0-4 TO 0
        ORA     #$11            ;TURN ON RUN & CLOSE HIGH SPEED
        STA     OUTPUT
        RTS

STOP    LDA     OUTPUT          ;LOAD CONTENTS OF OUTPUT
        AND     #$E0            ;CHANGE BITS 0-4 TO 0
        STA     OUTPUT          ;TURN ALL BITS OFF
        RTS

;*********** START OF RTI ROUTINE *******************

REALTI  CLRA                    ;RESET WATCH DOG TIMER
        STA     COPR
     BSET 7,STATUS      ;SET STATUS BIT
        LDA     PORTA           ;START OF THE INPUT ROUTINE
        AND     #$F0            ;RESET BIT 0-3
        STA     PORTA           ;SETS ADDRESS LINES MA0-MA3 TO 0
        LDA     #$08            ;# OF SHIFTS REQUIRED
        STA     TEMPCTR
IN07    LDA     PORTB
        AND     #$01            ;MASK OUT BIT 0
        BEQ     DATAE0
        SEC                     ;SET CARRY BIT
        ROR     INPUTL
        INC     PORTA           ;POINT TO NEXT LOCATION
        DEC     TEMPCTR
        BNE     IN07            ;DO AGAIN IF NOT DONE
        BRA     END07
DATAE0  CLC                     ;CLEAR CARRY BIT
        ROR     INPUTL
        INC     PORTA           ;POINT TO NEXT LOCATION
        DEC     TEMPCTR
        BNE     IN07
END07   LDA     #$04            ;# OF SHIFTS REQUIRED
```

```
          STA      TEMPCTR
IN16      LDA      PORTB
          AND      #$01     ;MASK OUT BIT 0
          BEQ      DATAEQ0
          SEC               ;SET CARRY BIT
          ROR      INPUTH
          INC      PORTA    ;POINT TO NEXT LOCATION
          DEC      TEMPCTR
          BNE      IN16     ;DO AGAIN IF NOT DONE
          BRA      END16
DATAEQ0   CLC               ;CLEAR CARRY BIT
          ROR      INPUTH
          INC      PORTA    ;POINT TO NEXT LOCATION
          DEC      TEMPCTR
          BNE      IN16

END16     ROR      INPUTH   ;ROTATE ALL BITS IN INPUTH 4 BITS RIGHT
          ROR      INPUTH
          ROR      INPUTH
          ROR      INPUTH
;*********************** start of out put *********
          CLRA              ;RESET WATCH DOG TIMER
          STA      COPR
          LDA      PORTA
          AND      #$F0     ;MASK OUT BITS 0-3
          STA      PORTA
          LDA      #$08     ;8 SHIFTS
          STA      TEMPCTR
          LDA      OUTPUT
          STA      TEMPREG  ;STORE DATA IN TEMP REG
OUTLOOP   ROR      TEMPREG  ;PUT BIT INTO CARRY BIT
          BCS      CARRY1
          BCLR     1,PORTB  ;SET DATA OUT BIT TO A 0
SETCLK    BCLR     4,PORTA  ;SET CLK LOW
          BSET     4,PORTA  ;SET CLK HIGH
          INC      PORTA    ;SET NEXT ADDRESS
          DEC      TEMPCTR
          BNE      OUTLOOP  ;DO AGAIN IF NOT DONE
          BRA      OUTDONE
CARRY1    BSET     1,PORTB  ;SET BIT TO A 1
          BRA      SETCLK
OUTDONE   BSET     2,TSCR   ;RESET RTI BIT
          CLRA              ;RESET WATCH DOG TIMER
          STA      COPR
          CLI
          RTI
;***********************************************************
;START OF PED TIMER OPTION ROUTINES PEDOPEN   BSET 7,OUTPUT   ;SET RESET HIGH
     BSET 1,STATUS   ;SET STATUS AS PED MODE ACTIVE
     SWI             ;ALLOW RESET TO BECOME ACTIVE
     BCLR 7,PORTA        ;CLEAR TRIGGER TO TIMER
     SWI             ;USED AS TIME DELAY TO ALLOW TIMER
```

EXHIBIT 1
Page 5 of 41

```
                    ;TO TRIGGER
        BSET 7,PORTA        ;SET TRIGGER TO INACTIVE STATE
        JMP  OPEN

RPEDTMR BCLR 7,OUTPUT  ;RESET PED TIMER
        BCLR 1,STATUS  ;RESET STATUS TO NO PED ACTIVE
        RTS

;************************AUTO CLOSE ROUTINE***************

AUTOCL  BRCLR    6,INPUTL,TIMEST      ;DOOR CLOSED TEST
        JSR  RSTATUS   ;RESET STATUS
        JMP  START
TIMEST  BRSET    0,STATUS,STATSET     ;BRANCH IF STATUS IS SET
        BSET 6,OUTPUT  ;ENABLE OUTPUT
        SWI            ;USED AS TIME DELAY TO ALLOW TIMER TO
                       ;SET
        BSET 0,STATUS  ;SET STATUS TO TIMING IN PROCESS
        BCLR 6,PORTA        ;TRIGGER TIMER
        NOP
        BSET 6,PORTA        ;RELEASE TRIGGER
        SWI            ;TIME TO ALLOW TIMER TO TRIGGER
STATSET BRSET    2,INPUTH,GOBY  ;TEST TIMER OUTPUT
        JMP  CLOSNS
GOBY JMP START

RSTATUS BCLR 0,STATUS  ;RESET STATUS
        BCLR 6,OUTPUT  ;RESET TIMER
        RTS

;************** REG SET-UPS**************

ORG  $0017
        DB   $09       ;MASK OPTION REG
                       ;ENABLE WATCH DOG TIMER & LOW VOLTAGE
RESET
        ORG  $03F8
        DW   REALTI    ;TIMER INTERUPT

ORG  $03FC
        DW   REALTI    ;TIMER INTERUPT

ORG  $03FE
        DW   RESET     ;RESET VECTOR
        END
```

^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z
^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z

; STANDARD WITH PED OPTION VERSION 1.02

;*************************************************************

```
TEMPPA      EQU     $00E0
TSCR        EQU     $0008
DDRA        EQU     $0004
DDRB        EQU     $0005
PORTA       EQU     $0000
PORTB       EQU     $0001
INPUTL      EQU     $00E1
INPUTH      EQU     $00E2
OUTPUT      EQU     $00E3
TEMPREG     EQU     $00E4
TEMPCTR     EQU     $00E5
STATUS      EQU     $00E6
COPR        EQU     $03F0
```

;************* START *********************

```
            ORG     $0200

;SET-UP REG
RESET       LDA     #$FF
            STA     DDRA        ;ALL OUTPUTS
            LDA     #$02
            STA     DDRB        ;BIT 0 =INPUT   BIT 1 OUTPUT
            LDA     #$F0
            STA     PORTA       ;SET UP PORT A
            STA     TEMPPA      ;STORE IN TEMP REG
            LDA     #$1C        ;ENABLE RTI SET RATE TO 8.2 MS
            STA     TSCR
            LDA     #$00
            STA     OUTPUT      ;SET UP "U3" OUTPUTS
            STA     INPUTL      ;TEMP NOT REQUIRED TO RUN
****************
            STA     INPUTH   ; "                                      "
            STA     TEMPREG  ; "
            STA     TEMPCTR  ; "**********************************"
      STA   STATUS
            LDX     #$FF        ;LOADS FF INTO INDEX REG.
            SWI                 ;RUN INTERUPT ROUTINE TO UPDATE OUTPUTS
```

```
                CLI               ;AND INPUT REGISTERS
                JMP       MODETST

;***************START***************************
;THIS ROUTINE WILL TEST FOR SWITCHES PRESSED OPEN & CLOSE IF
;BOTH ARE DETECTED IT WILL PUT SYSTEM INTO AUTO TEST MODE.

MODETST   BRSET      1,INPUTL,NORM   ;TEST OPEN SWITCH
      BRSET      2,INPUTL,NORM   ;TEST CLOSE SWITCH
      BSET 6,STATUS
RELEASE   BRCLR      1,INPUTL,RELEASE  ;TEST OPEN SWITCH
      BRCLR      2,INPUTL,RELEASE  ;TEST CLOSE SWITCH
      BRA  START
NORM BCLR 6,STATUS

START   JSR       RPEDTMR
      BRCLR      0,INPUTL,GOON   ;TEST STOP SWITCH
          JMP       STOPB     ;STOP DOOR
GOON        BRCLR      6,STATUS,TOPEN ;TEST FOR AUTO TEST MODE
      JMP  AMODE       ;GO TO AUTO MODE
TOPEN       BRSET      1,INPUTL,NOPEN  ;TEST OPEN SWITCH
          BRCLR   2,INPUTL,START   ;WILL LOOP UNTILL CLOSE SWITCH
OPENS
          JMP       OPEN      ;OPEN ROUTINE
NOPEN    BRSET  2,INPUTL,NOCLOSE    ;TEST CLOSE SWITCH
          BRCLR   1,INPUTL,START   ;WILL LOOP UNTILL OPEN SWITCH
OPENS
          JMP       CLOSE     ;CLOSE ROUTINE
NOCLOSE BRSET  4,INPUTL,NOPED ;TEST PED SWITCH
          JMP       PEDOPEN ;PED OPEN ROUTINE (THIS IS SET TO
"START"ON
                      ;NON PED OPTION SOFTWARE)
NOPED   BRCLR   5,INPUTL,YAUTO ;TEST AUTO SWITCH
      JSR  RSTATUS    ;RESET AUTO CLOSE STATUS
          JMP       START
YAUTO     JMP       AUTOCL

;*******************************************
STOPB   JSR       STOP
      JSR  RSTATUS     ;RESET STATUS FOR AUTO CLOSE ROUTINE
          JMP       START

;**************AUTO TEST MODE*****************
;THIS ROUTINE WILL CYCLE THE DOOR OPEN AND CLOSED UNTILL
;POWER IS REMOVED FROM THE SYSTEM

AMODE       BRCLR      6,INPUTL,GOCLOSE     ;TEST DOOR CLOSED PROX
      JMP  OPEN
GOCLOSE     JMP  CLOSE

;*******************************************
OPEN    JSR       RSTATUS    ;RESET STATUS FOR AUTO CLOSE
      BRCLR    1,INPUTH,NOTOPEN          ;TEST OPEN DOOR PROX
          JMP       START    ;GO TO START IF ALREADY OPEN
```

```
NOTOPEN  BRCLR    6,INPUTL,DORNC   ;TEST FOR DOOR CLOSED
         JSR      OPENHS   ;OPEN HIGH SPEED
         BRA      TESTLP
DORNC    JSR      OPENLS   ;OPEN LOW SPEED
TESTLP   BRCLR    7,INPUTL,STAYSL ;STAY SLOW IF DECEL PROX NOT
ACTIVE
         JSR      OPENHS   ;GO TO HIGH SPEED WHEN CLOSE DECEL PROX
IS TRUE
STAYSL   BRCLR    0,INPUTL,NEGSTOP      ;TEST STOP SWITCH
         JMP      START    ;THIS WILL JUMP TO START ROUTINE AND WILL
DETECT
NEGSTOP  BRSET    2,INPUTL,NOCL         ;STOP BUTTON PRESSED
         JSR      STOP     ;TEST CLOSE SWITCH
         JMP      START
NOCL     BRCLR    0,INPUTH,NODET   ;TEST FOR OPEN DECEL PROX
         JSR      OPENLS   ;CHANGE TO LOW SPEED
NODET    BRCLR    1,INPUTH,PEDSW ;TEST OPEN DOOR PROX
         JMP      STOPB    ;WILL STOP DOOR AND JMP TO START
PEDSW       BRCLR    1,STATUS,TESTLP ;TEST FOR PED OPTION ACTIVE
      BRCLR      4,INPUTL,TESTLP ;TEST AND BRANCH IF PED SW IS
ACTIVE
      BRSET      3,INPUTH,TESTLP ;TEST AND BRANCH IF TIMER IS
ACTIVE
      JMP STOPB         ;STOP DOOR AND JUMP TO START
;****************************************************************
;START OF CLOSE ROUTINE

CLOSE    JSR      RSTATUS        ;RESET STATUS FOR AUTO CLOSE
ROUTINE
CLOSNS     BRCLR    6,INPUTL,CLOSE1 ;TEST FOR DOOR ALREADY CLOSED
         JMP      START          ;DOOR IS ALREADY CLOSED
CLOSE1   BRCLR    1,INPUTH,CLOSE2 ;TEST FOR DOOR OPEN SIGNAL
         JSR      CLOSEHS        ;CLOSE AT HIGH SPEED
         BRA      RELOOP
CLOSE2   JSR      CLOSELS ;CLOSE LOW SPEED
RELOOP   BRCLR    0,INPUTH,CLOSE3 ;CHECK OPEN DECEL PROX
         JSR      CLOSEHS
CLOSE3   BRCLR    0,INPUTL,CLOSE4 ;TEST FOR STOP BUTTON
         JMP      START          ;THIS WILL STOP THE DOOR
CLOSE4   BRSET    3,INPUTL,CLOSE5 ;TEST EDGE SWITCH
         JSR      STOP
         JMP      OPEN
CLOSE5   BRSET    1,INPUTL,CLPED ;TEST FOR OPEN SWITCH
STPCLS   JSR      STOP
         JMP      START    ;WILL REOPEN DOOR IN "START" ROUTINE
CLPED      BRCLR    4,INPUTL,STPCLS ;TEST FOR PED OPEN ACTIVE
      BRCLR   7,INPUTL,CLOSE7 ;TEST FOR CLOSE DECEL PROX
         JSR      CLOSELS        ;SWITCH TO LOW SPEED
CLOSE7   BRCLR    6,INPUTL,RELOOP ;TEST FOR DOOR CLOSED PROX
         JMP      STOPB          ;STOP DOOR

;********** DRIVE CONTROL ROUTINES ***************
```

```
OPENLS  LDA     OUTPUT   ;LOAD CONTENTS OF OUTPUT
        AND     #$E0     ;CHANGE BITS 0-4 TO 0
        ORA     #$03     ;TURN ON RUN & OPEN LOW SPEED
        STA     OUTPUT
        RTS

OPENHS  LDA     OUTPUT   ;LOAD CONTENTS OF OUTPUT
        AND     #$E0     ;CHANGE BITS 0-4 TO 0
        ORA     #$05     ;TURN ON RUN & OPEN HIGH SPEED
        STA     OUTPUT
        RTS

CLOSELS LDA     OUTPUT   ;LOAD CONTENTS OF OUTPUT
        AND     #$E0     ;CHANGE BITS 0-4 TO 0
        ORA     #$09     ;TURN ON RUN & CLOSE LOW SPEED
        STA     OUTPUT
        RTS

CLOSEHS LDA     OUTPUT   ;LOAD CONTENTS OF OUTPUT
        AND     #$E0     ;CHANGE BITS 0-4 TO 0
        ORA     #$11     ;TURN ON RUN & CLOSE HIGH SPEED
        STA     OUTPUT
        RTS

STOP    LDA     OUTPUT   ;LOAD CONTENTS OF OUTPUT
        AND     #$E0     ;CHANGE BITS 0-4 TO 0
        STA     OUTPUT   ;TURN ALL BITS OFF
        RTS

;********** START OF RTI ROUTINE ******************

REALTI  CLRA             ;RESET WATCH DOG TIMER
        STA     COPR
     BSET 7,STATUS  ;SET STATUS BIT
        LDA     PORTA    ;START OF THE INPUT ROUTINE
        AND     #$F0     ;RESET BIT 0-3
        STA     PORTA    ;SETS ADDRESS LINES MA0-MA3 TO 0
        LDA     #$08     ;# OF SHIFTS REQUIRED
        STA     TEMPCTR
IN07    LDA     PORTB
        AND     #$01     ;MASK OUT BIT 0
        BEQ     DATAE0
        SEC              ;SET CARRY BIT
        ROR     INPUTL
        INC     PORTA    ;POINT TO NEXT LOCATION
        DEC     TEMPCTR
        BNE     IN07     ;DO AGAIN IF NOT DONE
        BRA     END07
DATAE0  CLC              ;CLEAR CARRY BIT
        ROR     INPUTL
        INC     PORTA    ;POINT TO NEXT LOCATION
        DEC     TEMPCTR
        BNE     IN07
END07   LDA     #$04     ;# OF SHIFTS REQUIRED
```

```
            STA     TEMPCTR
IN16        LDA     PORTB
            AND     #$01        ;MASK OUT BIT 0
            BEQ     DATAEQ0
            SEC                 ;SET CARRY BIT
            ROR     INPUTH
            INC     PORTA       ;POINT TO NEXT LOCATION
            DEC     TEMPCTR
            BNE     IN16        ;DO AGAIN IF NOT DONE
            BRA     END16
DATAEQ0     CLC                 ;CLEAR CARRY BIT
            ROR     INPUTH
            INC     PORTA       ;POINT TO NEXT LOCATION
            DEC     TEMPCTR
            BNE     IN16

END16       ROR     INPUTH      ;ROTATE ALL BITS IN INPUTH 4 BITS RIGHT
            ROR     INPUTH
            ROR     INPUTH
            ROR     INPUTH
;*********************** start of out put *********
            CLRA                ;RESET WATCH DOG TIMER
            STA     COPR
            LDA     PORTA
            AND     #$F0        ;MASK OUT BITS 0-3
            STA     PORTA
            LDA     #$08        ;8 SHIFTS
            STA     TEMPCTR
            LDA     OUTPUT
            STA     TEMPREG     ;STORE DATA IN TEMP REG
OUTLOOP     ROR     TEMPREG     ;PUT BIT INTO CARRY BIT
            BCS     CARRY1
            BCLR    1,PORTB     ;SET DATA OUT BIT TO A 0
SETCLK      BCLR    4,PORTA     ;SET CLK LOW
            BSET    4,PORTA     ;SET CLK HIGH
            INC     PORTA       ;SET NEXT ADDRESS
            DEC     TEMPCTR
            BNE     OUTLOOP     ;DO AGAIN IF NOT DONE
            BRA     OUTDONE
CARRY1      BSET    1,PORTB     ;SET BIT TO A 1
            BRA     SETCLK
OUTDONE     BSET    2,TSCR      ;RESET RTI BIT
            CLRA                ;RESET WATCH DOG TIMER
            STA     COPR
            CLI
            RTI
;****************************************************
;START OF PED TIMER OPTION ROUTINES PEDOPEN     BSET 7,OUTPUT   ;SET RESET HIGH
       BSET 1,STATUS    ;SET STATUS AS PED MODE ACTIVE
       SWI              ;ALLOW RESET TO BECOME ACTIVE
       BCLR 7,PORTA     ;CLEAR TRIGGER TO TIMER
       SWI              ;USED AS TIME DELAY TO ALLOW TIMER
```

```
                        ;TO TRIGGER
        BSET 7,PORTA        ;SET TRIGGER TO INACTIVE STATE
        JMP  OPEN

RPEDTMR  BCLR 7,OUTPUT   ;RESET PED TIMER
        BCLR 1,STATUS   ;RESET STATUS TO NO PED ACTIVE
        RTS

;*********************AUTO CLOSE ROUTINE**************

AUTOCL    BRCLR      6,INPUTL,TIMEST       ;DOOR CLOSED TEST
      JSR  RSTATUS    ;RESET STATUS
      JMP  START
TIMEST    BRSET      0,STATUS,STATSET      ;BRANCH IF STATUS IS SET
      BSET 6,OUTPUT  ;ENABLE OUTPUT
      SWI            ;USED AS TIME DELAY TO ALLOW TIMER TO
                     ;SET
      BSET 0,STATUS  ;SET STATUS TO TIMING IN PROCESS
      BCLR 6,PORTA        ;TRIGGER TIMER
      NOP
      BSET 6,PORTA        ;RELEASE TRIGGER
      SWI            ;TIME TO ALLOW TIMER TO TRIGGER
STATSET   BRSET      2,INPUTH,GOBY   ;TEST TIMER OUTPUT
      JMP  CLOSNS
GOBY JMP  START

RSTATUS  BCLR 0,STATUS  ;RESET STATUS
      BCLR 6,OUTPUT  ;RESET TIMER
      RTS

;************** REG SET-UPS**************

ORG       $0017
        DB        $09      ;MASK OPTION REG
                           ;ENABLE WATCH DOG TIMER & LOW VOLTAGE
RESET
        ORG       $03F8
        DW        REALTI   ;TIMER INTERUPT

ORG       $03FC
        DW        REALTI   ;TIMER INTERUPT

ORG       $03FE
        DW        RESET    ;RESET VECTOR
        END
```

It is claimed:

1. A control system for a door positioning assembly having a door mounted on a track, the door being movable between an open position and a closed position, the door having a leading edge adjacent a door opening, an edge arranged to define a second opening, a pass door pivotably coupled to the second opening, the control system comprising:

proximity means for providing a door position signal in response to the position of the door on the track system, a user input for providing user input signals including open inputs, stop inputs including signals provided by a stop button of a user-operated switch, and close inputs in response to user commands, a plurality of sensors for providing stop input signals in response to the position of an object located within a detection zone adjacent the door opening, in response to contact between an object and the leading edge of the door, and in response to the position of the pass door, a signal processor to provide controller instructions in response to the door position signal and the user input signals, and a controller configured to vary the speed and direction of travel of the door in response to the controller instructions, the controller instructions instructing the controller to move the door in an open direction in response to open inputs, to stop the movement of the door in response to stop inputs, and to move the door in a closed direction in response to close inputs.

2. The control system of claim 1, wherein the open inputs include signals provided by an open button for providing an open input signal in response to the user-operated switch and a motion detector for providing an open input signal in response to motion of an object located within a detection zone.

3. The control system of claim 1, wherein the close inputs include signals provided by a close button for providing a close input signal in response to the user-operated switch.

4. The control system of claim 1, wherein the user input includes a manual control having manual switches connected to the signal processor, a reverse edge having an edge switch appended to the door, the edge switch being connected to the signal processor, and an auto close timer connected to the signal processor.

5. The control system of claim 1, wherein the signal processor further includes means for moving the door to the closed position when the door is starting from a position other than the closed position in response to an absence of user input signals.

6. The control system of claim 5, wherein the signal processor further includes an auto close timer for delaying actuation of the moving means for a predetermined delay time after the signal processor receives a last user input signal.

7. The control system of claim 1, wherein the signal processor further includes an input processor for providing run signals and speed select signals in response to the position of the door.

8. The control system of claim 1, wherein the signal processor further includes a signal generator for providing the controller instructions in response to the user input signals and in response to the run signals and the speed select signals.

9. A control system for a door positioning assembly having a movable door mounted on a track, the control system comprising input processor means for providing run signals and speed select signals in response to user commands and in response to the position of the door on the track system, a run relay switch having an open configuration and a closed configuration, the run relay switch being arranged to switch the configuration of the run relay switch in response to a run signal, a plurality of speed select relay switches, each speed select relay switch having an open configuration and a closed configuration, each speed select relay switch being arranged to switch the configuration of the speed select relay switch in response to a speed select signal, and controller means for varying the speed and direction of travel of the door in response to the configurations of the run relay switch and the speed select relay switches.

10. The control system of claim 9, wherein the control system further includes a variable resistor configured to be adjusted to one of a plurality of resistance settings and speed control means for providing a speed signal in response to the resistance setting of the variable resistor.

11. The control system of claim 10, wherein the speed select relay switch is a normally open switch, the run relay switch is a normally open switch, and the controller means responds to the speed signal when the speed select relay is in a closed configuration and the run relay is in a closed configuration.

12. A control system for a door positioning assembly having a movable door mounted on a track, the control system comprising:

proximity means for providing a door position signal in response to the position of the door on the track, user means for providing user inputs in response to user commands, the user means including pedestrian button means for providing a pedestrian open user input in response to a user-operated switch, pedestrian open timer means for providing a timing signal in response to a start signal, and input processor means for providing run signals and speed select signals in response to user inputs and in response to the door position signal, the input processor means including a pedestrian start time configured to generate a start signal in response to the pedestrian open input signal and pedestrian open means for providing a run signal of a predetermined duration in response to the timing signal.

13. A control system for a door positioning assembly having a movable door mounted on a track, the control system comprising proximity means for providing a door position signal in response to the position of the door on the track system, open means for providing open inputs in response to user commands, close means for providing close inputs in response to user commands, stop means for providing stop inputs in response to user commands, input processor means for providing run signals and speed select signals in response to open inputs, close inputs, stop inputs, and in response to the door position signal, a normally open run relay switch arranged to close in response to run signals, a plurality of normally open speed select relay switches arranged to close in response to speed select signals, and controller means for varying the speed and direction of travel of the door in response to the status of the run relay switch and the speed select relay switches.

14. A control apparatus for positioning a door mounted on a track, the control apparatus comprising:
- a controller coupled to the door for reciprocally moving the door on the track between a fully closed position and a fully open position, the controller being configured to move the door at a plurality of speeds;
- a first sensor for detecting the door in the fully closed position;
- a second sensor for detecting the door in the fully open position;
- a third sensor located adjacent the fully closed position for detecting the door in a partially closed position;
- a fourth sensor located adjacent the fully open position for detecting the door in a partially open position; and
- a signal processor coupled to the controller and the first, second, third, and fourth sensors, the signal processor including means for commanding the door to travel at a first closing speed from the fully open position to the partially closed position, at a second closing speed from the partially closed position to the fully closed position, at a first opening speed from the fully closed position to the partially open position, and at a second opening speed from the partially open position to the fully open position.

15. The apparatus of claim 14, wherein the first closing and opening speeds are faster than the second closing and opening speeds.

16. The apparatus of claim 15, further comprising a signal generator to provide a run signal for commencing movement of the door, the signal generator being coupled to the signal processor, the signal processor further including means for commanding the door to travel toward the fully closed position at the second closing speed if the run signal commences closing movement when the door is located between the fully open and fully closed positions and commanding the door to travel toward the fully open position at the second opening speed if the run signal commences opening movement when the door is located between the fully open and fully closed positions.

17. The apparatus of claim 14, wherein the signal processor includes at least two variable resistors, each having an adjustable, resistance value proportional to one of the first and second closing and opening speeds.

18. The apparatus of claim 14, further comprising a motion detector, the motion detector being coupled to the signal processor, the signal processor further including means for commanding the door to travel toward the fully open position when the motion detector senses motion within a detection zone adjacent the door.

19. The apparatus of claim 14, further comprising a reverse edge sensor on an edge of the door, the reverse edge sensor being coupled to the signal processor, the signal processor further including means for commanding the door to travel toward the fully open position when the reverse edge sensor detects contact between the edge of the door and an object when the door is not in the fully closed position.

20. The apparatus of claim 14, further comprising a photo electric sensor for detecting an object in a predetermined area adjacent the door, the photo electric sensor being coupled to the signal processor, the signal processor further including means for commanding the door to travel toward the fully open position when the photo electric sensor detects an object in the predetermined area.

21. The apparatus of claim 14, further comprising a manual open switch, the manual open switch being coupled to the signal processor, the signal processor further including means for commanding the door to travel toward the fully open position when a user activates the manual open switch.

22. The apparatus of claim 14, further comprising a manual stop switch, the manual stop switch being coupled to the signal processor, the signal processor further including means for commanding the door to stop moving when a user activates the manual stop switch.

23. The apparatus of claim 14, further comprising a manual close switch, the manual close switch being coupled to the signal processor, the signal processor further including means for commanding the door to travel toward the fully closed position when a user activates the manual close switch.

24. The apparatus of claim 14, further comprising a pedestrian open signal, the pedestrian open signal being coupled to the signal processor, the signal processor further including means for commanding the door to travel for a predetermined amount of time from the fully closed position towards the fully open position in response to the pedestrian open signal.

25. The apparatus of claim 24, wherein the signal processor further comprises a variable resistor having a resistance value that is proportional to the predetermined amount of time of travel of the door in response to the pedestrian open signal.

26. The apparatus of claim 14, wherein the signal processor further includes an automatic close timer, the signal processor further including means for commanding the door to travel to the fully closed position if the door has been stationary in other than the fully closed position for longer than a predetermined amount of time indicated by the automatic close timer.

27. The apparatus of claim 26, wherein the signal processor further comprises a variable resistor having a resistance value that is proportional to the predetermined amount of time of indicated by the automatic close timer.

28. A control system for a door positioning assembly having a movable door mounted on a track, the control system comprising:
- a proximity sensor which provides a door position signal in response to the position of the door on the track,
- user input switches including a pedestrian switch to generate a pedestrian open input signal,
- a pedestrian start timer configured to generate a start signal in response to the pedestrian open input signal,
- a pedestrian open timer configured to generate a timing signal in response to the start signal, and
- an input processor configured to generate a run signal in response to user input switches and in response to the door position signal, the input processor providing the run signal of a predetermined duration in response to the timing signal.

* * * * *